US012720392B2

(12) United States Patent
Määttänen et al.

(10) Patent No.: US 12,720,392 B2
(45) Date of Patent: Aug. 25, 2026

(54) CELL RESELECTION PRIORITIES BETWEEN TERRESTRIAL NETWORKS AND NON-TERRESTRIAL NETWORKS

(71) Applicant: Telefonaktiebolaget LM Ericsson (PUBL), Stockholm (SE)

(72) Inventors: Helka-Liina Määttänen, Espoo (FI); Johan Rune, Lidingö (SE); Chao He, Sollentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 588 days.

(21) Appl. No.: 18/042,065

(22) PCT Filed: Aug. 20, 2021

(86) PCT No.: PCT/IB2021/057681

§ 371 (c)(1),
(2) Date: Feb. 17, 2023

(87) PCT Pub. No.: WO2022/038573

PCT Pub. Date: Feb. 24, 2022

(65) Prior Publication Data

US 2023/0319661 A1 Oct. 5, 2023

Related U.S. Application Data

(60) Provisional application No. 63/068,042, filed on Aug. 20, 2020.

(51) Int. Cl.
*H04W 36/08* (2009.01)
*H04W 36/00* (2009.01)
*H04W 36/30* (2009.01)

(52) U.S. Cl.
CPC ... *H04W 36/083* (2023.05); *H04W 36/00838* (2023.05); *H04W 36/0085* (2018.08); *H04W 36/304* (2023.05)

(58) Field of Classification Search
CPC ......... H04W 36/083; H04W 36/00838; H04W 36/0085; H04W 36/304; H04W 48/10; H04W 84/06; H04B 7/18513
See application file for complete search history.

(56) References Cited

U.S. PATENT DOCUMENTS 6,272,315 B1 * 8/2001 Chang ................ H04B 7/18563 455/433
8,706,115 B2 4/2014 Pani et al.
(Continued)

FOREIGN PATENT DOCUMENTS

CO 2020004815 A2 5/2020
EP 0 951 190 A2 10/1999
(Continued)

OTHER PUBLICATIONS

3GPP TSG RAN WG2 Meeting #107; Prague, Czech Republic, Aug. 26-30, 2019; Agenda Item: 11.6.4; Source: Sony; Title: Service continuity in NTN (R2-1909909 (Revision of R2-1907051)).
(Continued)

*Primary Examiner* — Charles C Jiang
*Assistant Examiner* — Margaret Marie Anderson
(74) *Attorney, Agent, or Firm* — Baker Botts L.L.P.

(57) ABSTRACT

A method performed by a wireless device for cell reselection includes identifying a non-terrestrial network (NTN) providing coverage for the wireless device. The wireless device receives a parameter from a network node. The parameter includes an indication to search for a terrestrial network (TN) though the NTN provides coverage for the wireless device. Based on the parameter, the wireless device searches for the TN and prioritizes the TN over the NTN when selecting the TN for cell reselection.

26 Claims, 12 Drawing Sheets

(56) References Cited

U.S. PATENT DOCUMENTS

| | | | |
|---|---|---|---|
| 10,887,832 B2 | 1/2021 | Ohlsson et al. | |
| 2020/0228194 A1* | 7/2020 | Hassan Hussein | H04L 1/1822 |
| 2021/0377849 A1* | 12/2021 | Xu | H04W 36/36 |
| 2022/0030532 A1* | 1/2022 | Hajir | H04B 7/18513 |

FOREIGN PATENT DOCUMENTS

| | | |
|---|---|---|
| EP | 3487088 B1 | 3/2023 |
| WO | WO2020030712 A1 | 2/2020 |
| WO | WO2020030713 A2 | 2/2020 |

OTHER PUBLICATIONS

EPO Communication pursuant to Article 94(3) EPC issued for Application No. 21 762 804.9-1206—Jun. 11, 2025.
3GPP TSG-RAN WG2 Meeting #107; Prague, CZ; Aug. 26-30, 2019; Title: Report of Email Discussion [106#72] [NR/NTN] TP on NTN-TN Service continuity; Source: Nokia (Email discussion rapporteur) (R2-1910692).
3GPP TSG-RAN WG2 #108; Reno, USA; Nov. 18-22, 2019; Source: NEC; Title: Service continuity between TN and NTN (R2-1914974).
3GPP TSG-RAN WG2 Meeting #108; Reno, USA; Nov. 18-22, 2019; Source: NEC, Huawei, HiSilicon, ZTE Corporation, Sanechips; Title: TP on service continuity between NTN and TN (R2-191xxxx).
PCT International Search Report issued for International application No. PCT/IB2021/057681—Nov. 26, 2021.
PCT Written Opinion of the International Searching Authority issued for International application No. PCT/IB2021/057681—Nov. 26, 2021.
3GPP TSG RAN meeting #80; La Jolla, USA, Jun. 11-14, 2018; Source: Thales; Title: Study on solutions evaluation for NR to support Non Terrestrial Network; Type: SID new; Document for: Approval; Agenda Item: 9.1.17—Study on solutions evaluation for NR to support Non Terrestrial Network, moderator: Thales (RP-181370).
3GPP TR 38.821 V16.0.0 (Dec. 2019); 3rd Generation Partnership Project; Technical Specification Group Radio Access Network; Solutions for NR to support non-terrestrial networks (NTN) (Release 16).
3GPP TR 38.811 V15.3.0 (Jul. 2020); 3rd Generation Partnership Project; Technical Specification Group Radio Access Network; Study on New Radio (NR) to support non-terrestrial networks (Release 15).
Office Action issued for Columbian Patent Application No. NC/2023/0003284 (PCT/IB2021/057681)—Dec. 3, 2025.

* cited by examiner

CELL RESELECTION PRIORITIES BETWEEN TERRESTRIAL NETWORKS AND NON-TERRESTRIAL NETWORKS

PRIORITY

This nonprovisional application is a U.S. National Stage Filing under 35 U.S.C. § 371 of International Patent Application Serial No. PCT/IB2021/057681 filed Aug. 20, 2021 and entitled "CELL RESELECTION PRIORITIES BETWEEN TERRESTRIAL NETWORKS AND NON-TERRESTRIAL NETWORKS" which claims priority to U.S. Provisional Patent Application No. 63/068,042 filed Aug. 20, 2020, both of which are hereby incorporated by reference in their entirety.

TECHNICAL FIELD

The present disclosure relates, in general, to wireless communications and, more particularly, systems and methods for determining cell selection and reselection priorities between Terrestrial Networks (TNs) and Non-Terrestrial Networks (NTNs).

BACKGROUND

The current 5th Generation Radio Access Network RAN (NG-RAN) architecture is depicted and described in 3GPP TS 38.401v15.4.0 and illustrated in FIG. 1.

The NG-RAN consists of a set of gNodeBs (gNBs) connected to the 5th Generation Core (5GC) through the NG interface. An gNB can support Frequency Division Duplex (FDD) mode, Time Division Duplex (TDD) mode or dual mode operation. gNBs can be interconnected through the Xn interface. A gNB may consist of a Central Unit (gNB-CU) and Distributed Units (gNB-DUs). A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (i.e., NG, Xn, F1), the related TNL protocol and the functionality are specified. The TNL provides services for user plane transport and signaling transport.

A gNB may also be connected to an Long Term Evolution (LTE) eNodeB (eNB) via the X2 interface. Another architectural option is that where an LTE eNB connected to the Evolved Packet Core (EPC) network is connected over the X2 interface with a so called nr-gNB. The latter is a gNB not connected directly to a CN and connected via X2 to an eNB for the sole purpose of performing dual connectivity. The architecture in FIG. 1 can be expanded by spitting the gNB-CU into two entities. A first entity may correspond to the User Plane (gNB-CU-UP), which serves the user plane and hosts the Packet Data Convergence Protocol (PDCP). The second entity may correspond to the Control Plane (gNB-CU-CP), which serves the control plane and hosts the PDCP and Radio Resource Control (RRC) protocol. For completeness it should be said that a gNB-DU hosts the Radio Link Control (RLC), Medium Access Control (MAC) and Physical Layer (PHY) protocols.

Cell selection is the process performed by a User Equipment (UE) for selecting a cell to camp on when the UE does not already camp on a cell. Cell reselection is the corresponding process when the UE is already camping on a cell. Thus, cell reselection is the process of finding a better cell to camp on than the current serving cell (camping cell) and start camping on that cell instead. As used herein, "camping on a cell" means that the UE is synchronized with the cell's downlink transmissions, which ensures that up to date system information (that is relevant for the UE's operation) for the cell is stored in the UE. While camped on a cell, the UE monitors the PDCCH for paging transmissions and monitors the channel quality to assess the cell's suitability as a serving cell in relation to other cells to potentially camp on (by performing cell reselection). A UE camps on a cell while in the RRC_IDLE and RRC_INACTIVE states. The cell a UE is camping on is also referred to as the UE's serving cell. Cell selection and cell reselection in NR are specified in 3GPP TS 38.304.

Of central importance in the cell selection and cell reselection procedures is the cell selection criterion, S, which is specified as follows:

The cell selection criterion S is fulfilled when:

$$Srxlev>0 \text{ AND } Squal>0$$

where:

$$Srxlev=Q_{rxlevmeas}-(Q_{rxlevmin}+Q_{rxlevminoffset})-P_{compensation}-Qoffset_{temp}$$

$$Squal=Q_{qualmeas}-(Q_{qualmin}+Q_{qualminoffset})-Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122 [9]. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122 [9]. |
| $P_{compensation}$ | For FR1, if the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) For FR2, $P_{compensation}$ is set to 0. |
| $P_{EMAX1}$, $P_{EMAX2}$ | Maximum TX power level of a UE may use when transmitting on the uplink in the cell (dBm) defined as $P_{EMAX}$ in TS 38.101 [15]. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the |

-continued

| | |
|---|---|
| | p-Max and NR-NS-PmaxList respectively in SIB1, SIB2 and SIB4 for normal UL as specified in TS 38.331 [3]. |
| $P_{PowerClass}$ | Maximum RF output power of the UE (dBm) according to the UE power class as defined in TS 38.101-1 [15]. |

See, 3GPP TS 38.304.

Another central concept in the cell selection and cell reselection procedures is a "suitable cell". In brief, a suitable cell is a cell that fulfils the cell selection criterion and in which the UE can receive normal service. FIG. 2 illustrates the states and state transitions for a UE cell selection and cell reselection in RRC_IDLE or RRC_INACTIVE state.

With regard to cell selection, there are two variants in NR:

Initial cell selection, where the UE has no prior knowledge of which radio frequency channels are NR frequencies, in which case the UE scans all radio frequency channels in the NR bands according to its capabilities to find a suitable cell to select and camp on.

Cell selection by leveraging stored information, where the UE has stored previously acquired information about frequencies and possibly also cell parameters, which it utilizes to streamline the procedure of selection a suitable cell to camp on.

In 3GPP TS 38.304, these cell selection variants are specified as follows:

Cell selection is performed by one of the following two procedures:

a) Initial cell selection (no prior knowledge of which RF channels are NR frequencies):

1. The UE shall scan all RF channels in the NR bands according to its capabilities to find a suitable cell.
2. On each frequency, the UE need only search for the strongest cell, except for operation with shared spectrum channel access where the UE may search for the next strongest cell(s).
3. Once a suitable cell is found, this cell shall be selected.

b) Cell selection by leveraging stored information:

1. This procedure requires stored information of frequencies and optionally also information on cell parameters from previously received measurement control information elements or from previously detected cells.
2. Once the UE has found a suitable cell, the UE shall select it.
3. If no suitable cell is found, the initial cell selection procedure in a) shall be started.

NOTE: Priorities between different frequencies or RATs provided to the UE by system information or dedicated signalling are not used in the cell selection process.

Cell reselection involves reselection between cells on the same carrier frequency, between cells on different carrier frequencies as well as between different Radio Access Technologies (RATs) (on different carrier frequencies).

With regard to the latter, the network can configure priorities which govern how the UE performs cell reselection between carrier frequencies and RATs. The network can further configure threshold-based conditions which must be fulfilled for inter-frequency/RAT cell reselection to take place. The carrier frequency and RAT priorities and the thresholds governing inter-frequency and inter-RAT cell reselection can be configured through the broadcast system information and the carrier frequency and RAT priorities can also be configured through dedicated signaling using the RRCRelease message.

For cell reselection to a higher priority carrier frequency or RAT, it suffices that the concerned cell's quality exceeds a configured threshold. For cell reselection to a lower priority carrier frequency or RAT, the concerned cell's quality has to exceed a configured threshold and the serving cell's quality has to be below another configured threshold. Cell reselection to a cell on a carrier frequency with equal priority, including the current carrier frequency (i.e. intra-frequency cell reselection) is based on a cell ranking procedure which is described further below.

Cell reselection to a higher priority RAT/carrier frequency has precedence over a lower priority RAT/frequency, if multiple cells of different priorities fulfil the cell reselection criteria. If multiple cells fulfil the cell reselection criteria on the selected (i.e. highest priority) carrier frequency and this carrier frequency is a New Radio (NR) carrier, the UE reselects to the highest ranked of these cells according to the above-mentioned cell ranking procedure. If multiple cells fulfil the cell reselection criteria on the selected (i.e. highest priority) (non-NR) RAT, the UE reselects to one of these cells in accordance with the criteria that apply for that RAT. If cells on multiple carrier frequencies and/or RATs fulfill the cell reselection criteria, the UE should reselect to a cell on the carrier frequency or RAT with the highest priority (out of the ones for which there are cells meeting the cell reselection criteria). If multiple cells fulfil the cell reselection criteria on this carrier frequency/RAT, the UE uses the above mentioned call ranking to select a cell.

When multiple NR cells with equal priority fulfil the cell reselection criteria, including both intra-frequency cells and inter-frequency cells (where the inter-frequency carrier frequencies have a priority that is equal to the priority of the UE's current carrier frequency), the UE uses a cell ranking procedure to identify the best (highest ranked) cell to reselect to. The cell ranking is performed as follows:

For each cell involved in the cell ranking the UE calculates a ranking value (denoted $R_n$ for a neighbor cell and $R_s$ for the serving cell) according to the following two formulae (one for the serving cell and one for neighbor cells):

$$R_s = Q_{meas,s} + Q_{hyst} - Qoffset_{temp}$$

$$R_n = Q_{meas,n} - Qoffset - Qoffset_{temp}$$

where:

| | |
|---|---|
| $Q_{meas}$ | Reference Signal Received Power (RSRP) measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in 3GPP TS 38.331. |

To determine a cell's RSRP ($Q_{meas,s}$ for the serving cell, $Q_{meas,n}$ for a neighbor cell), the UE measures the RSRP of each of the cell's Synchronization Signal Blocks (SSBs) and calculates the linear average of a set of the resulting RSRP values. The set of SSB RSRP values to base the averaging on is determined by two parameters configured in the system information: An RSRP threshold, absThreshSS-BlocksConsolidation, which the RSRP of an SSB must exceed for the SSB's RSRP value to be part of the average calculation, and an integer parameter, nrofSS-BlocksToAvearge, representing the maximum number of RSRP values to be used in the averaging. That is, the UE calculates the average (in the linear domain) of the up to nrofSS-BlocksToAvearge highest RSRP values exceeding absThreshSS-BlocksConsolidation. If less then nrofSS-BlocksToAvearge RSRP values exceed absThreshSS-BlocksConsolidation, the UE calculates the linear average of the RSRP values that exceed absThreshSS-BlocksConsolidation. If no SSB RSRP value exceeds absThreshSS-BlocksConsolidation, the UE determines the cell RSRP as the RSRP of the SSB with the highest RSRP in the cell. Both nrofSS-BlocksToAverage and absThreshSS-BlocksConsolidation are optional to configure. If any of them is absent, the UE determines the cell RSRP as the RSRP of the SSB with the highest RSRP in the cell.

As one option, the UE reselects to (or remains in) the highest ranked cell, i.e. the one with the highest R ($R_n$ or $R_s$) value, according to the above algorithm. That is, if one of the neighbor cells is ranked the highest, the UE reselects to that cell, while if the current serving cell gets the highest rank, then the UE remains camping on the current serving cell.

As another option, the network may configure an offset range in relation to the highest calculated R value ($R_n$ or $R_s$), denoted rangeToBestCell. With this option, any non-highest ranked cell whose ranking value, $R_n$ or $R_s$, closer to the highest R value than rangeToBestCell, are qualified to a second round, where the UE selects the cell to reselect to (or remain camping on, in case the serving cell is selected) based on the number of SSBs each cell has with RSRP values above absThreshSS-BlocksConsolidation. If two or more of these cells have the same number of SSBs with RSRP above absThreshSS-BlocksConsolidation, the UE selects the cell with the highest R value. If rangeToBestCell is configured, but absThreshSS-BlocksConsolidation is not configured, the UE considers that there is one SSB above the threshold for each cell on that frequency.

In order for the any of the above described conditions for cell reselection to result in a cell reselection, it must persist for a configurable time period (t-reselectionNR for NR or t-reselectionEUTRA for Evolved Universal Terrestrial Radio Access (EUTRA), which respectively correspond to the parameters $Treselection_{NR}$ and $Treselection_{EUTRA}$ in 3GPP TS 38.304), which is configured in the system information. An additional condition is that no preceding cell reselection has occurred during the last 1 second.

If the cell a UE has selected for reselection is found to be not suitable, the UE will not reselect to that cell. The UE's further behavior is specified in section 5.2.4.4 in 3GPP TS 38.304.

The standard has several built-in mechanisms for limiting the amount of neighbor cell measurements a UE needs to perform and the frequency of its cell reselections. To this end, the UE may choose not to perform intra-frequency measurements, if the serving cell fulfils $Srxlev>S_{IntraSearchP}$ and $Squal>S_{IntraSearchQ}$. Similarly, if the serving cell fulfils $Srxlev>S_{nonIntraSearchP}$ and $Squal>S_{nonIntraSearchQ}$, the UE may choose not to perform measurements on NR inter-frequencies or inter-RAT frequency cells of equal or lower priority. However, the UE shall not refrain from measuring on NR inter-frequencies or inter-RAT frequencies with a reselection priority higher than the reselection priority of the current NR frequency.

The cell reselection rules in 3GPP TS 38.304 further limits the maximum frequency of cell reselections to once per second, i.e. according to the specified cell reselection rules a UE must camp on a cell for at least one second before it can reselect to another cell. In addition, a cell reselection condition, in terms of measured neighbor cell quality (and, when applicable, serving cell quality) must be fulfilled during the time period $Treselection_{RAT}$ before it can trigger a cell reselection, where $Treselection_{RAT}$ is configurable in the range 0-7 seconds. The use of a hysteresis, realized by the configurable $Q_{hyst}$ parameter in the ranking formula for the serving cell (i.e. in the formula $R_s=Q_{meas,s}+Q_{hyst}-Qoffset_{temp}$) also serves to reduce the frequency of cell reselections, as it favours remaining in the current serving cell. Furthermore, for 3GPP Release 16 of NR, a means is specified for the network to configure a UE to be allowed to relax its neighbor cell measurements for cell reselection evaluation when certain conditions are fulfilled that indicate that the need or probability for a cell reselection in the near future is low.

Another means is available that does not reduce the number or frequency of neighbor cell measurements, but the means instead reduces the effort a UE spends on a neighbor cell measurement. This is the SSB Measurement Timing Configuration (SMTC), by which the network can configure a periodic time window per carrier frequency, in which the SSB transmissions that the RRC_ILDE or RRC_INACTIVE UE measures occurs. For neighbor cell measurements in RRC_CONNECTED state, a UE may be configured with more advanced SMTC, including cell specific SMTC.

There is an ongoing resurgence of satellite communications. Several plans for satellite networks have been announced in the past few years. The target services vary, from backhaul and fixed wireless, to transportation, to outdoor mobile, to IoT. Satellite networks could complement mobile networks on the ground by providing connectivity to underserved areas and multicast/broadcast services. To benefit from the strong mobile ecosystem and economy of scale, adapting the terrestrial wireless access technologies including LTE and NR for satellite networks is drawing significant interest. For example, 3GPP completed an initial study in Release 15 on adapting NR to support non-terrestrial networks (mainly satellite networks). See, 3GPP TR 38.811, Study on New Radio (NR) to support non-terrestrial networks. This initial study focused on the channel model for the non-terrestrial networks, defining deployment scenarios, and identifying the key potential impacts. 3GPP is conducting a follow-up study item in Release 16 on solutions evaluation for NR to support non-terrestrial networks. See, RP-181370, Study on solutions evaluation for NR to support non-terrestrial networks.

A satellite radio access network usually includes the following components:

- Gateway that connects satellite network to core network
- Satellite that refers to a space-borne platform
- Terminal that refers to user equipment
- Feeder link that refers to the link between a gateway and a satellite
- Service link that refers to the link between a satellite and a terminal The link from gateway to terminal is often called forward link, and the link from terminal to gateway is often called return link or access link. Depending on the functionality of the satellite in the system, we can consider two transponder options

- Bent pipe transponder (also referred to as transparent satellite or transparent payload): satellite forwards the received signal back to the earth with only amplification and a shift from uplink frequency to downlink frequency.

Regenerative transponder (also referred to as regenerative satellite or regenerative payload): satellite includes on-board processing to demodulate and decode the received signal and regenerate the signal before sending it back to the earth.

Depending on the orbit altitude, a satellite may be categorized as low earth orbit (LEO), medium earth orbit (MEO), or geostationary (GEO) satellite:

LEO: typical heights ranging from 250-1,500 km, with orbital periods ranging from 90-130 minutes.

MEO: typical heights ranging from 5,000-25,000 km, with orbital periods ranging from 2-14 hours.

GEO: height at about 35,786 km, with an orbital period of 24 hours.

A communication satellite typically generates several beams over a given area. The footprint of a beam is usually in an elliptic shape, which has been traditionally considered as a cell, but cells consisting of the coverage footprint of multiple beams are excluded. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 3 illustrates an example architecture of a satellite network with bent pipe transponders.

There currently exist certain challenge(s). For example, one issue with certain of the approaches discussed above is that it proposes the UE to have either TN or NTN priority set without considering that if there is the case when UE is located at an area with both TN and NTN coverage. In this ignored scenario, the NTN channel quality, e.g., RSRP, is likely higher than the respective TN channel quality because, for example, a clear Line-of-Sight (LoS) NTN channel with few obstacles occurs more often than its TN counterpart. If the existing solutions and approaches discussed above are used, there will be a large possibility that the throughput of the NTN cell will be challenged due to large amounts of UEs (supporting both TN and NTN) selecting, reselecting, and/or/camping on the good channel quality NTN cell. As such, these solutions and approaches create potential congestion for future data transmissions. Worse, if all of the UEs that are both TN and NTN-capable select the NTN cell, the capacity of the NTN cell may not be enough to, for example, page all of the UEs before communication. This is because NTN cell size is so much larger than TN cell size that the NTN cell's capacity to serve all UEs in the area of the cell is limited.

One further concern is that certain NTN cells have more mobility that needs to be handled, in a given period, than TN cells, because of the rapid arriving and departing nature of non-geostationary satellites in a given aerial zone. The time domain cost is not considered in the existing solution/the proposed approach.

SUMMARY

Certain aspects of the present disclosure and their embodiments may provide solutions to these or other challenges. In particular, some embodiments address the need for further means to balance the load between a TN and an NTN and to enable service continuity between TN and NTN accesses, by instructing implicitly both—TN/NTN-capable UEs on how to weigh different factors hidden behind the cell types.

According to certain embodiments, a method by a wireless device for cell reselection includes identifying a NTN providing coverage for the wireless device. The wireless device receives a parameter from a network node. The parameter includes an indication to search for a TN though the NTN provides coverage for the wireless device. Based on the parameter, the wireless device searches for the TN and prioritizes the TN over the NTN when selecting the TN for cell reselection.

According to certain embodiments, a wireless device includes processing circuitry configured to identify a NTN providing coverage for the wireless device. The processing circuitry is further configured to receive a parameter from a network node. The parameter includes an indication to search for a TN though the NTN provides coverage for the wireless device. Based on the parameter, the processing circuitry is configured to search for the TN and prioritizes the TN over the NTN when selecting the TN for cell reselection.

According to certain embodiments, a method by a network node for cell reselection includes sending a parameter to a wireless device. The parameter includes an indication that the wireless device is to search for a TN though a NTN provides coverage for the wireless device.

According to certain embodiments, a network node includes processing circuitry configured to send a parameter to a wireless device. The parameter includes an indication that the wireless device is to search for a TN though a NTN provides coverage for the wireless device Certain embodiments may provide one or more of the following technical advantage(s). For example, a technical advantage of certain embodiments disclosed herein may serve to reduce the occurrence frequency of certain undesired situations, where NTN cells are overloaded. This may lower the intermittent connection requests from UEs who are performing cell selection/reselection when satellite becomes visible in specific area. Further, this reduces the risk that UEs attempting to connect to NTN cells in cell selection/reselection procedure will have to reselect TN cells and, therefore, decreases the overhead in long run.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
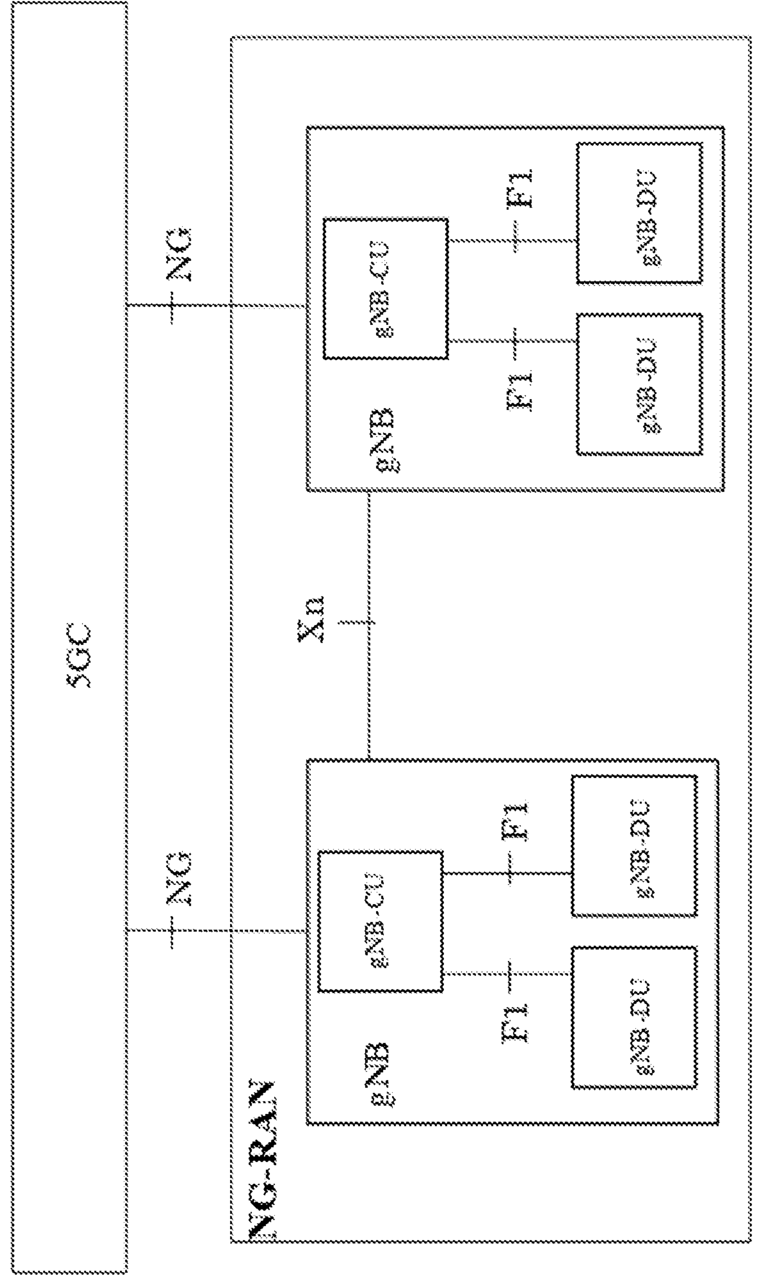
FIG. 1 illustrates an NG-RAN architecture.
Figure 2:
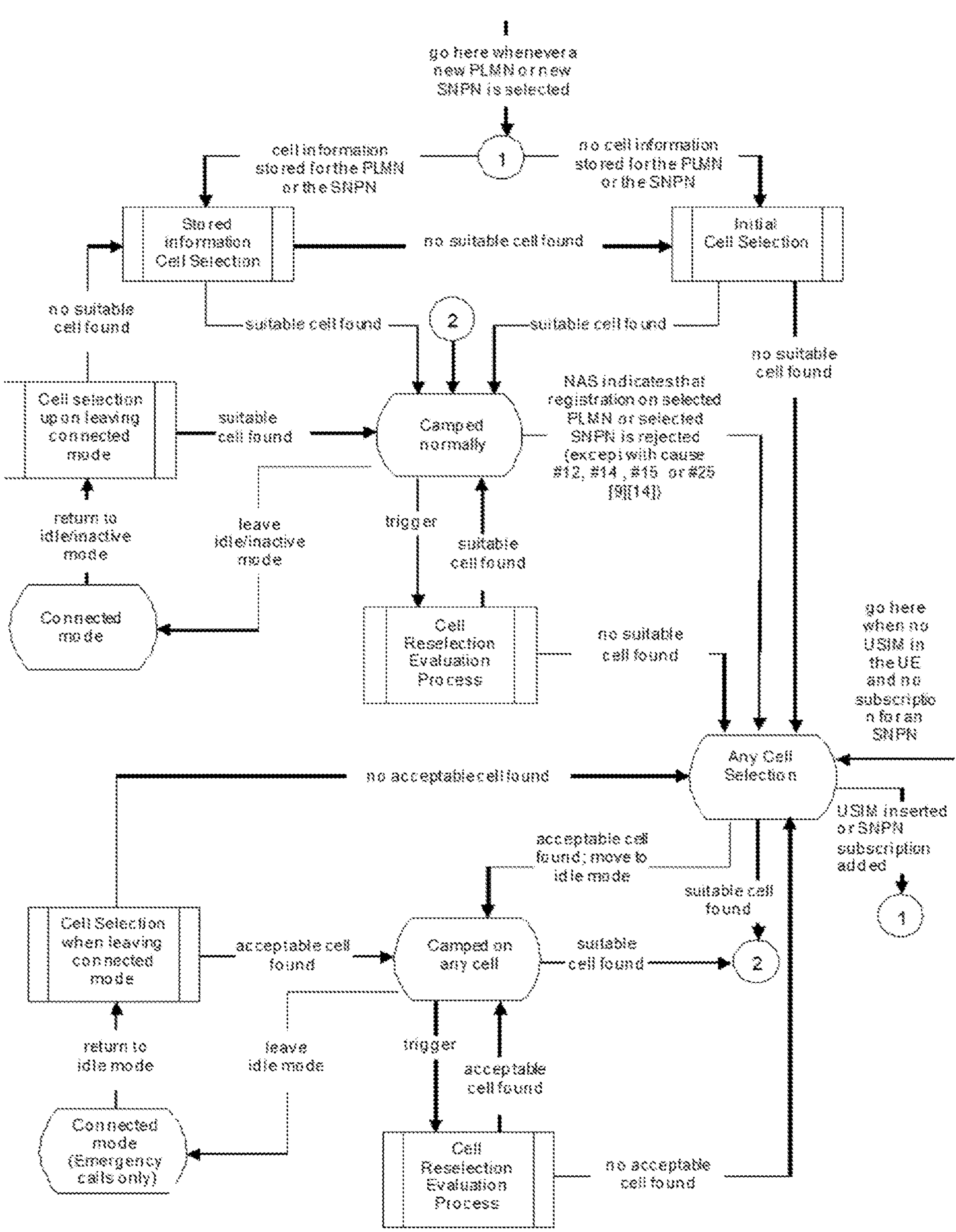
FIG. 2 illustrates the states and state transitions for a UE cell selection and cell reselection in RRC_IDLE or RRC_INACTIVE state.
Figure 3:
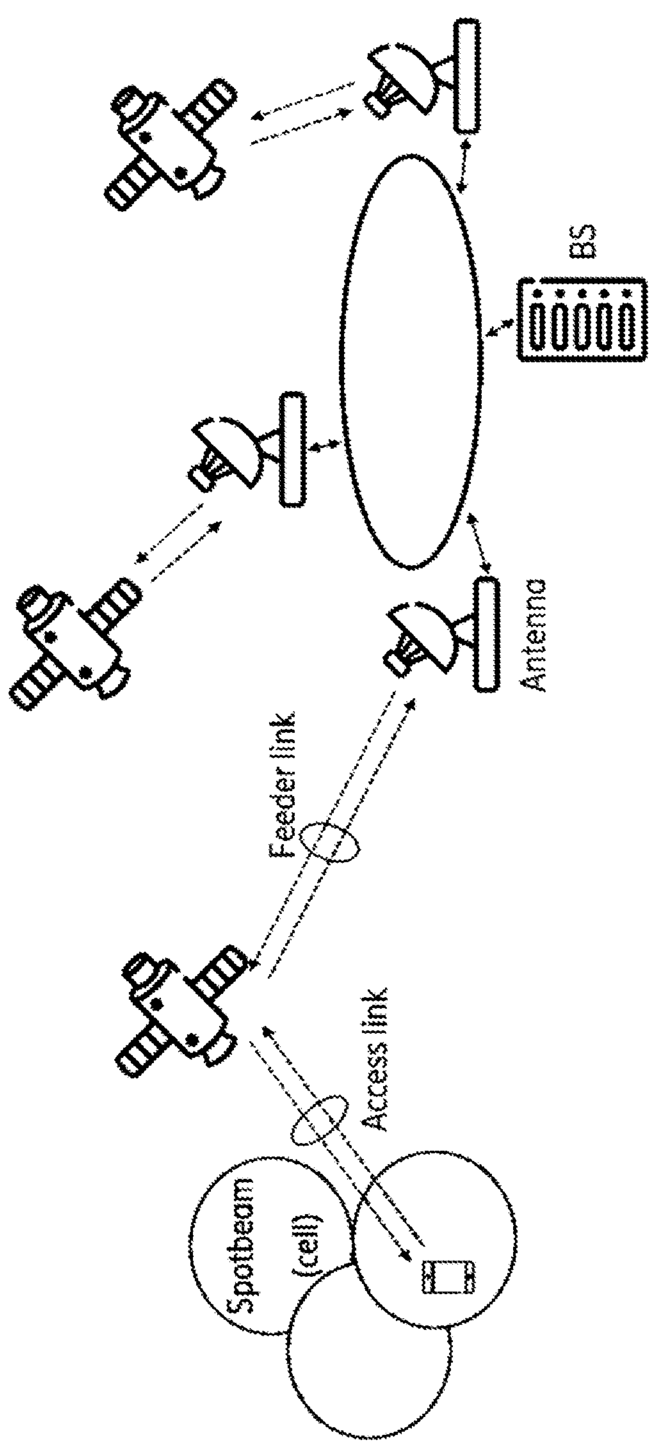
FIG. 3 illustrates an example architecture of a satellite network with bent pipe transponders.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Embodiments disclosed herein may be relevant for situations where TN coverage and NTN coverage overlap, or where TN and NTN coverage partly overlap, and where the coverage situation changes due to NTN satellite movement and, for example, large scale shadowing. It is assumed herein that the UE has both TN-capability and NTN-capability, and that the UE either can use both capabilities simultaneously or only one at a time. Where the UE can use only one capability at a time, determining which capability to activate may be governed by certain trigger condition(s).

Certain embodiments described herein may apply where a TN cell and an NTN cell coincidently use the same carrier. For example, a satellite covering an area may span several countries, and multiple TN cells in a specific one of the covered countries may happen to use the same carrier.

Certain embodiments described herein may apply where the TN cell and the NTN cell are using different carriers to serve the target area. Embodiments disclosed herein leverage the observation that when the TN and NTN coverage overlap, the NTN RSRP level may be higher than the TN RSRP level.

As disclosed herein, the term "satellite" may be often used even when a more appropriate term would be "gNB associated with the satellite." Here, gNB associated with a satellite might include both a regenerative satellite, where the gNB is the satellite payload, where the gNB is integrated with the satellite or a transparent satellite, and/or where the satellite payload is a relay and the gNB is on the ground (i.e., the satellite relays the communication between the gNB on the ground and the UE). Embodiments disclosed herein will be described in terms of NTNs using the NR radio access technology for communication between the UE and the satellite/gNB, but the solutions, methods, and techniques disclosed herein are applicable also in NTNs using other radio access technologies, such as LTE.

Indistinguishable Carrier for TN and NTN Cells

As described above, in certain embodiments, the TN and NTN cells may employ a similar carrier frequency that is indistinguishable from the perspective of UEs. Thus, it may be difficult for UEs to tell which carrier is for TN or for NTN. According to certain embodiments, a new cell-specific parameter, InsistTNSearch, is introduced so that the network can control if the network wants the UE to keep looking for TN networks even if the UE has acceptable NTN RSRP coverage. This new cell specific parameter is allowed to be broadcast by both TN and NTN cells. The introduction of such parameter aims at ensuring balanced load split between TN and NTN networks. In other words, the activation of the cell specific parameter, InsistTNSearch (={true}), can be triggered when, for example, the network observes insufficient NTN cells capability, or when the network sees congestion on service links and/or feeder links, or when a TN cell has overall good channel quality, or when a TN cell's load is low enough.

For example, in a particular embodiment, a candidate satellite or gNB may use the total number of UEs camping on the candidate satellite as one criterion to decide whether InsistTNSearch shall be set as true or not. For example, the candidate satellite or gNB may indicate InsistTNSearch=true to all the UEs that have not camped on the candidate satellite but are already in its coverage if the total number of UEs camping on the candidate satellite surpasses a pre-configured threshold.

Additionally or alternatively, in a particular embodiment, the candidate satellite or gNB may use the remaining paging capability as one criterion to decide whether InsistTNSearch shall be set as true. For example, the candidate satellite or gNB may indicate InsistTNSearch=true to all the UEs that have not camped on the candidate satellite but are already in its coverage if the remaining paging capability of the candidate satellite is lower than a specified or configured threshold.

As another example, in a particular embodiment, the candidate satellite or gNB may use geolocation information and the historical statistics of throughput for certain area as one criterion to decide whether InsistTNSearch shall be set as true. The candidate satellite or gNB may indicate InsistTNSearch=true to all the UEs that are within coverage of the candidate satellite, if by leveraging the ephemeris information of the candidate satellite, the historical statistics of throughput for the respective area is always overloaded. By "always" it means the percentage of throughput overload situation from history during a given period is larger than a specified or configured threshold.

As another example, in a particular embodiment, if the surveillance of the current service link throughput is above the throughput of the feeder link by an offset, the candidate satellite or gNB may turn off new attempts from UEs to camp on the candidate satellite by assign true to InsistTNSearch. It is worth mentioning that the listed cases above do not serve as a comprehensive enumeration of when there is a need to set InsistTNSearch to be true.

As a variant of satellite set and broadcast InsistTNSearch=true, according to certain embodiments, TN cell may also let InsistTNSearch be true and then broadcast to the UEs in coverage. Given that TN cell size may be much smaller than NTN cell size, the TN set-and-broadcast InsistTNSearch may have a better spatial granularity when compared to its NTN counterpart. Stated differently, manipulations on UE's preference of TN over NTN can be done in a smaller geographical area. For instance, InsistTNSearch=true is allowed when the number of UEs already connected to/camped on the TN cell is lower than a configured threshold.

Conversely, according to certain embodiments, InsistTNSearch may be set to false when, for instance, the UE is camping on the TN. Additionally, in some areas, there may not be a TN network so UEs should not be looking for TN network and consume their batteries.

According to certain embodiments, when the InsistTNSearch parameter is set to "true", the UE has to search for TNs (e.g. search for carrier frequencies associated with TNs). Conversely, when the parameter is absent or set to "false", the UE may or may not search for TNs. This may be up to the UE implementation.

According to certain other embodiments, when the InsistTNSearch parameter is set to "true", the UE has to search for TNs (e.g. search for carrier frequencies associated with TNs), while when the parameter is absent or set to "false", the UE must not search for TNs (or should at least ignore TNs).

According to certain other embodiments, a new cell-specific parameter, InsistNTNSearch, is introduced. In a particular embodiment, for example, when the InsistNTNSearch parameter is set to "true", the UE has to search for NTNs (e.g. search for carrier frequencies associated with TNs). Conversely, when the parameter is absent or set to "false", the UE may or may not search for NTNs. This may be up to UE implementation.

As another example, in a particular embodiment, when the InsistNTNSearch parameter is set to "true", the UE has to search for NTNs (e.g. search for carrier frequencies associated with NTNs). Conversely, when the parameter is absent or set to "false", the UE must not search for NTNs (or should at least ignore NTNs).

According to certain embodiments, whether to let TN or NTN broadcast the priority information is up to the network. Since the NTN covers a much larger area which may have quite a few TN cells in there already, the priority broadcast by NTN is more general. For example, the priority information may indicate that certain TN cells should be prioritized or down-prioritized, as these TN cells might have carrier reuse among them, it would be hard to distinguish the cell only based on carrier). If TN broadcasts the priority information, UE can have a clear ranking for each cell.

In a particular embodiment, when a UE receives contradicting InsistTNSearch values (assigned by TN gNB and satellite/gNB), the UE follows the behavior that needs to be specified. This can be fixed in the specification where, for example, one of the priorities is always overriding. Alternatively, the network, which has both information from TN and NTN, may be allowed to configure a priority of InsistTNSearch values from different network type. For instance, the core network may configure TN configured parameter InsistTNSearch as always having a higher priority. Then, when both TN and NTN gNB configure contradicting values, the UE will follow TN configured value. When only TN gNB or only NTN gNB configures, it does not need this priority.

In still another embodiment, the priority indicated by the TN network or NTN network may always win. This may be specified separately.

According to certain other embodiments, new cell specific parameters, TnNtnOffset and Qmin, are introduced. The parameter TnNtnOffset is exploited in combination with the channel quality counters, e.g., RSRP and/or Reference Signal Received Quality (RSRQ). Note that the TnNtnOffset parameter could be set per TN carrier frequency and may be set per RAT:

- A parameter governing TN search or no TN search, e.g. searchForTN ENUMERATED {true}.
- A parameter, TnNtnOffset, governing a UE's preference of TN over NTN.
- A minimum acceptable quality, Qmin.
- Indications of TN carrier frequencies.

A very informally written example of rules for the UE follows:

```
If searchForTN = "true", search for available TN(s);
        If one or more TN is/are found; and
        the best of the found TN(s) has a quality QtnBest >
Qntn − TnNtnOffset; and
        the best of the found TN(s) has a quality QtnBest >
Qmin
                select the best of the found TN(s);
        Else if Qntn < Qmin
                Select the best of the available
NTN(s) and TN(s);
        (Else
                Stick to the current (or best) NTN.)
```

The searchForTN indication could be implicit in the presence of a configured TnNtnOffset. In some embodiments, an explicit searchForTN parameter may be used so that the other parameters can be optional. Note also that in the above description of the example parameters, it is recognized that TN and NTN may be swapped out such that the searchForTN parameter may be replaced by a searchForNTN parameter.

Since NTN cells are assumed to be so large, it may be an option to complement the searchForTN parameter with geographical information such as, for example, areas in which TNs may be available or areas in which TNs definitely are not available. Such geographical area descriptions may also be used to indicate where TNs can be expected to be available (but without mandating either search for TN or no search for NTN). Parameters for describing geographical areas and area shapes are already specified by 3GPP and may be reused for this purpose, in particular embodiments.

In a particular embodiment, a TnNtnOffset (or other parameter such as those described above) is broadcast in a TN cell and/or an NTN cell. For example, in a particular embodiment, the parameter may be broadcast in all cells, just like frequency/RAN priorities are currently broadcast in all cells. Different values may be broadcast in different cells, if this is the operator's preference. Note also that since such priorities (and offsets) may be used for load balancing purposes, they may well be changed over time, depending on the load on the respective carriers/networks, and more long-term also depending on deployments of new cells and also depending on long-term changes in traffic demand and usage of NTN UEs or TN/NTN UEs.

According to certain embodiments, a geo-location-based margin TnNtnOffset_margin may be added by UE. In certain area within the TN cell or NTN cell, the channel quality may differ dramatically, e.g., when TN or NTN still wants the UE to search only among TN cells even if UE is on the edge of TN cell and is close to the center of NTN cell. In this case, the TnNtnOffset value works fine for the UEs in proximity of a TN cell center but may no longer be efficient for TN cell edge UEs. Consequently, a positive margin may be needed. Thus, in a particular embodiment, TnNtnOffset_margin may be added to the configured TnNtnOffset to ensure corner case UEs' behaviours are still under control. Comer case UEs are more like UEs on the edge if the TnNtnOffset is set for cell center UEs.

The advantage of this embodiment is that a TN cell has the ability to control the UE's behaviour as if there are more sub-cells while in reality no sub-cells are created.

In some embodiments, a new priority list of TN cells such as, for example, TNprio, may be introduced as cell specific parameters at NTN cells to provide better granularity in controlling UEs' preference on TN or NTN cells. For example, the TN cells may be prioritized over NTN cells where the PLMN ids of the TN cells are included in the priority list, TNprio. The UEs receiving the priority list search among the prioritized TN cells whose PLMN ids are on the list. In case none of the TN cells in the priority list can provide a sufficiently good channel quality, UEs will search among the remaining TN cells and NTN cells since the remaining TN cells are not prioritized. In some embodiments, the priority list can be combined with the TnNtnOffset parameters in ranking the TN/NTN cells for cell selection/reselection. In a particular embodiment, for example, the ranking expression may be as follows:

$$R = \begin{cases} Q_{cell}, & \text{if cell is an } NTN \text{ cell or a non-prioritized } TN \text{ cell} \\ Q_{cell} + TnNtnOffset, & \text{if cell is a prioritized } TN \text{ cell} \end{cases}$$

In a particular embodiment, cell specific priorities may be combined with carrier frequency-specific (or network type-specific, e.g. NTN-specific) cell reselection priorities, such that cell specific priorities override the carrier frequency priority for cells which have cell specific priorities associated. For other cells, the carrier frequency priority is applied.

One scenario in which this approach may be used is where an NTN cell covers very many (e.g. hundreds or thousands) TN cells and where the network/operator generally wants to steer the UEs to preferred TN cells, but with some TN cells excluded. The NTN cell could then broadcast TN carrier frequency reselection priorities for all TN cells in coverage, which would be applied for all TN cells for which not cell specific priority is available (i.e. as a default), but for the TN cells to be excluded. The NTN cell also broadcasts cell specific priorities set to the lowest (or one of the lowest priorities, e.g. lower than the default priority for the carrier frequency).

Notably, when TN and NTN cells employ indistinguishable carriers, the UE may not be capable to verify whether one cell is a TN cell or an NTN cell. However, in a particular embodiment, the UE may have the opportunity to estimate the angle of arrival (AoA) in the downlink while searching for a synchronization sequence. If the estimated AoA is above certain configured or specified threshold, the cell associated with the respective synchronization sequence used in estimation may be considered as an NTN cell and, thus, be deprioritized. Some limitations can be applied to this method such as, for example, when the AoA is high enough, when TN cell gNB is deployed on a skyscraper, or when the candidate satellite is approaching the horizon which leads to a low elevation angle.

According to certain embodiments, prioritization on RAT can be adapted in this case if NTN may be considered as another RAT. This would allow placing reselection priorities pertaining to NTNs in separate IEs such as, for example, in an IE corresponding to the existing CarrierFreqListEUTRA in SIB5. This, in turn, makes it easy to make the priorities ignored by legacy UEs. Another way to associate frequency priorities with NTNs is to use the existing reselection priority related parameters (e.g. the ones associated with NR frequencies in SIB4), but introduce a new list of network type indications (where the network type could, for example, be any of NR, TN, NTN, NTN-GEO, NTN-MEO, NTN-LEO, NTN-HAPS, NTN-HIBS, EUTRA. The list of network type indications would be ordered in the same order as the carrier frequencies are listed in the configuration data (e.g. in SIB4), such that the $N^{th}$ listed network type indication corresponds to the $N^{th}$ listed carrier frequency. Such a separate network type indication list would be ignored by legacy UEs, which hence would not distinguish between TNs and NTNs when assessing cell reselection candidates. As an example, a network type indication list could be defined as follows:

```
NetworkTypeList-r17 ::=     SEQUENCE (SIZE (1..maxFreq)) OF
NetworkType-r17
NetworkType-r17 ::=       ENUMERATED {TN, NTN-GEO, NTN-MEO,
                          NTN-LEO, NTN-HAPS, NTN-HIBS, TN-
                          EUTRA, NTN-GEO-EUTRA, NTN-MEO-
                          EUTRA, NTN-LEO-EUTRA, NTN-HAPS-
                          EUTRA, NTN-HIBS-EUTRA}
```

Then each "instance" of NetworkType-r17 in the NetworkTypeList-r17 would correspond, or be associated with, an "instance" of InterFreqCarrierInfo in the InterFreqCarrierFreqList in SIB4 (i.e., the $N^{th}$ instance of NetworkType-r17 would be associated with the $N^{th}$ instance of InterFreqCarrierFreqInfo. The InterFreqCarrierFreqList is defined in SIB4 in 3GPP TS 38.331 as follows:

```
InterFreqCarrierFreqList ::=        SEQUENCE (SIZE (1..maxFreq))
OF InterFreqCarrierFreqInfo
```

According to certain embodiments, for a UE that has both TN and NTN capabilities/transceivers but may not have both in use simultaneously, upon receiving one of the above mentioned parameters such as, for example, in redirect message, the rules may indicate that the UE should look at the other access. For example, if the UE has a NTN transceiver operating or is otherwise operating based on NTN capability, the UE should consider TN access. Conversely, if the UE as a TN transceiver operating or is otherwise operating based on TN capability, the UE should consider NTN access. In one embodiment, the rules are the same as for UEs having both TN and NTN capabilities in use and in yet another embodiment, the rules may be defined separately, or there may be specific offsets involved for this case.

As a generalization any of the parameters described here initially to be broadcasted may also be fixed in the specification or given in a dedicated RRC message to the UE.

Figure 4:
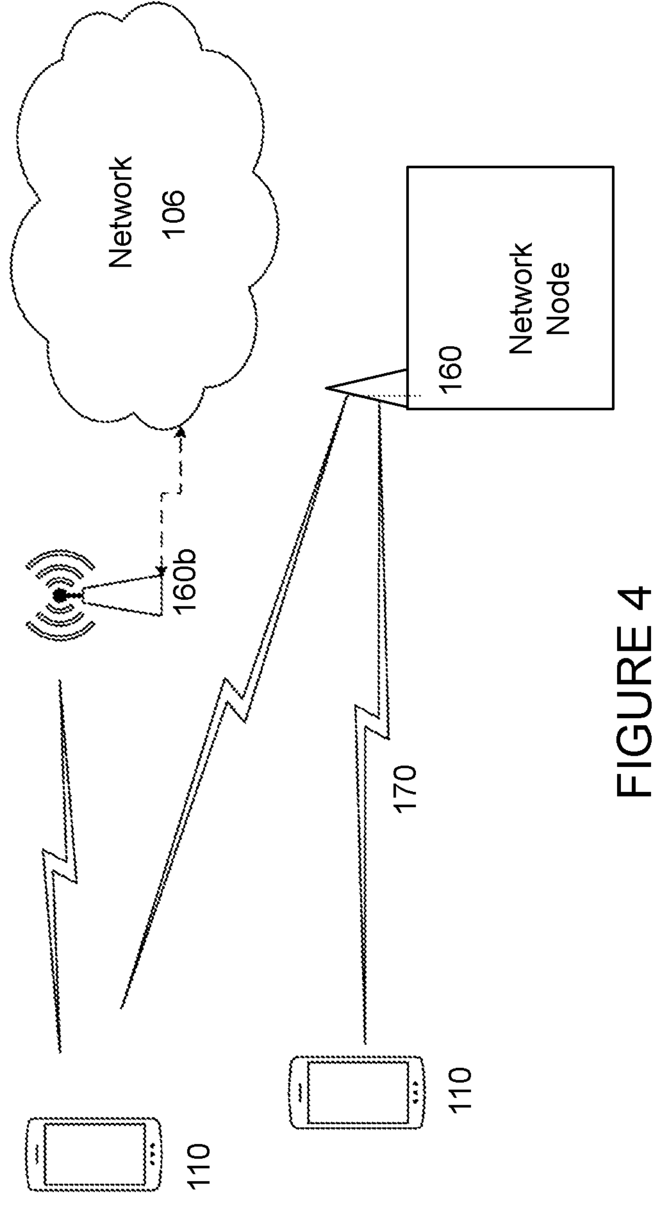
FIG. 4 illustrates an example wireless network, according to certain embodiments.

FIG. 4 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and wireless devices (WDs) 110. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
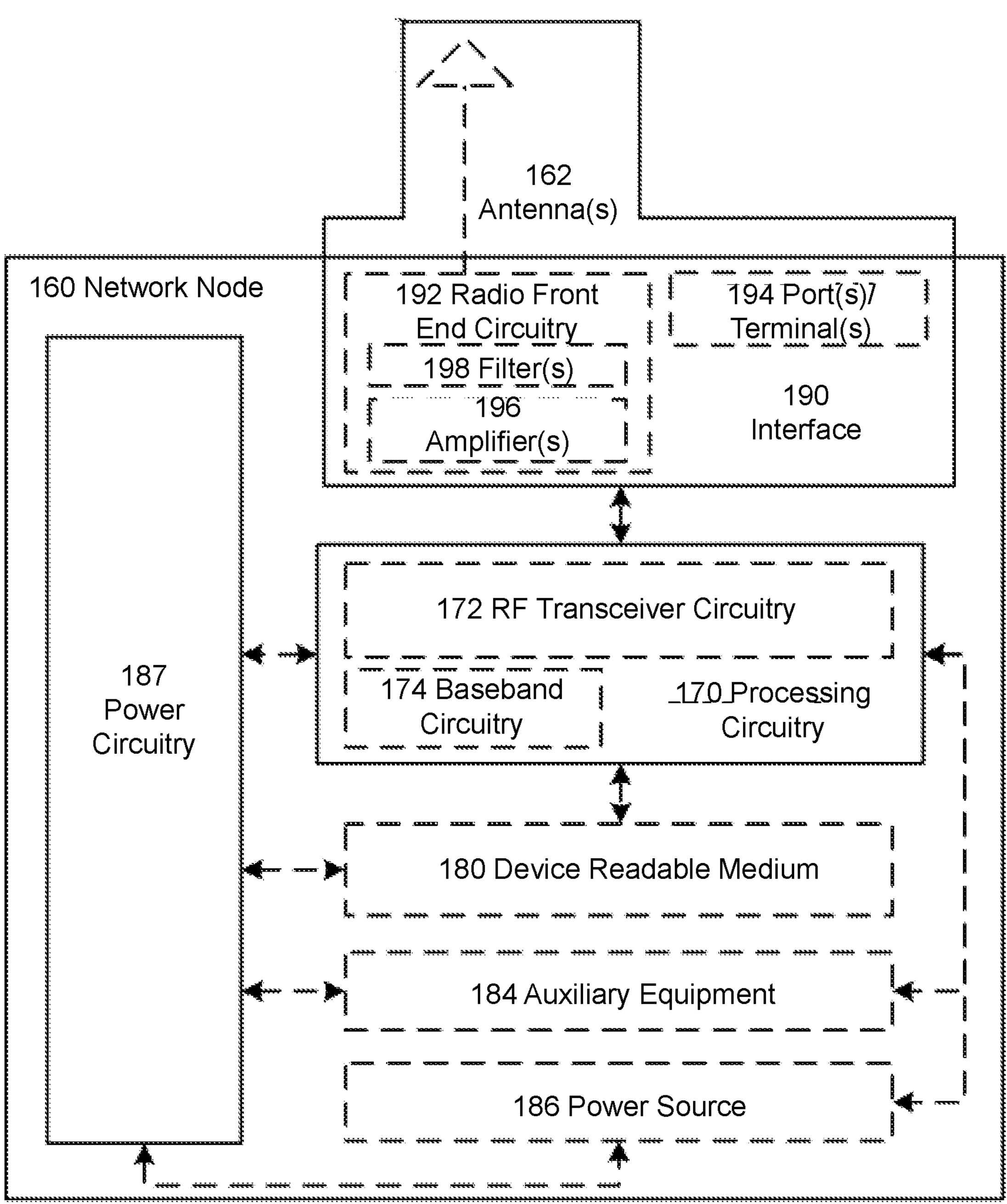
FIG. 5 illustrates an example network node, according to certain embodiments.

FIG. 5 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
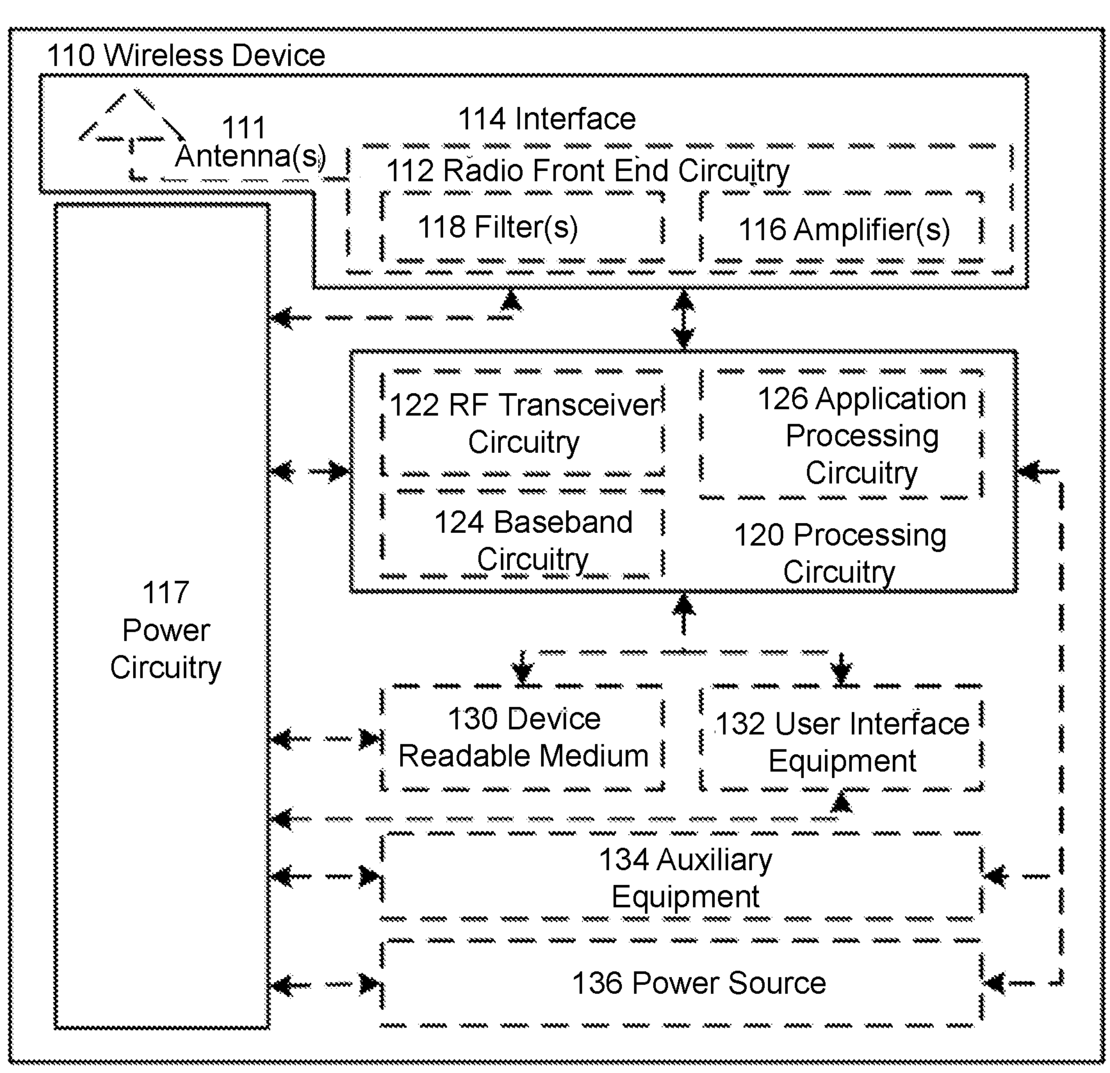
FIG. 6 illustrates an example wireless device, according to certain embodiments.

FIG. 6 illustrates an example wireless device 110, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
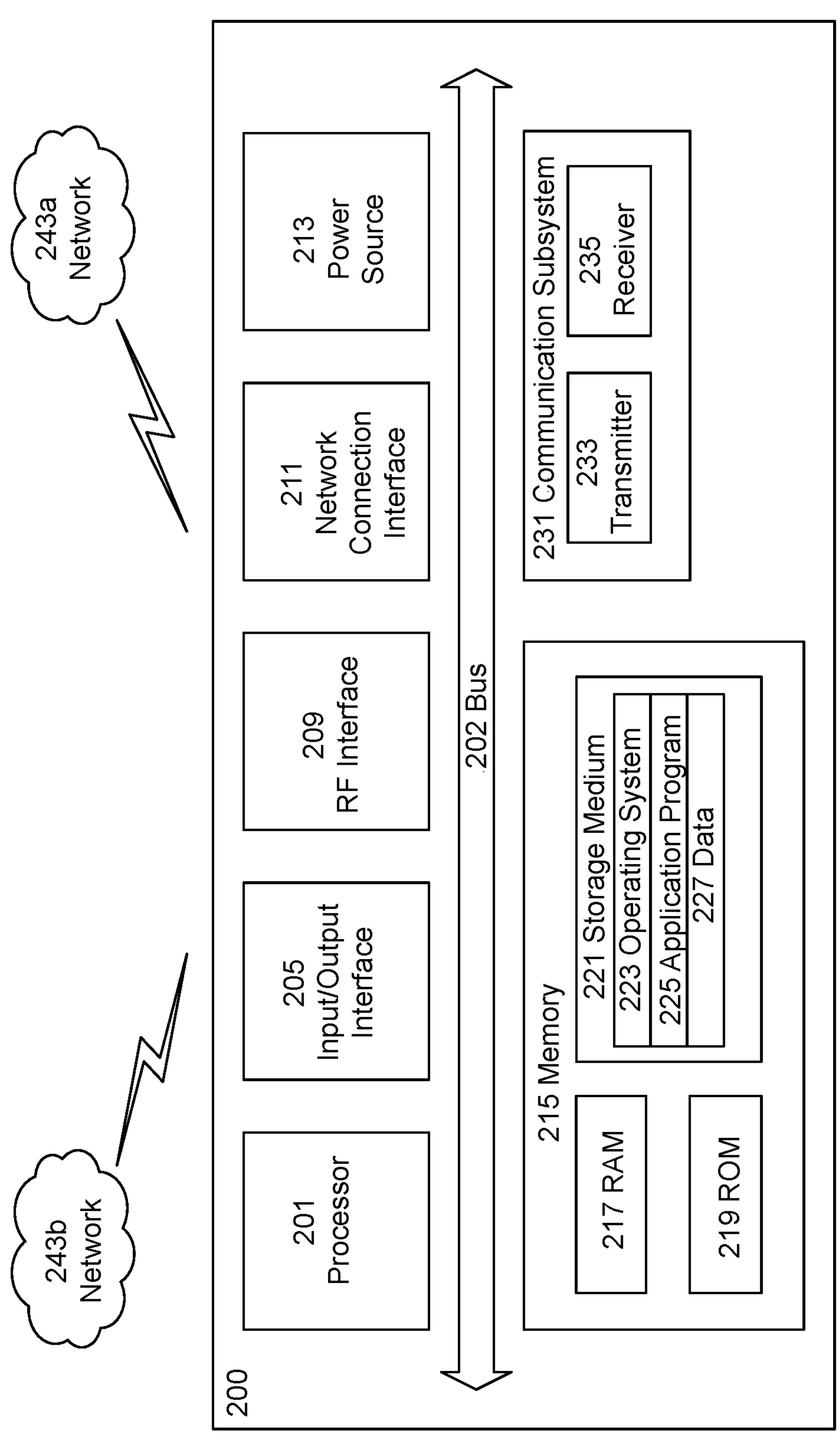
FIG. 7 illustrate an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
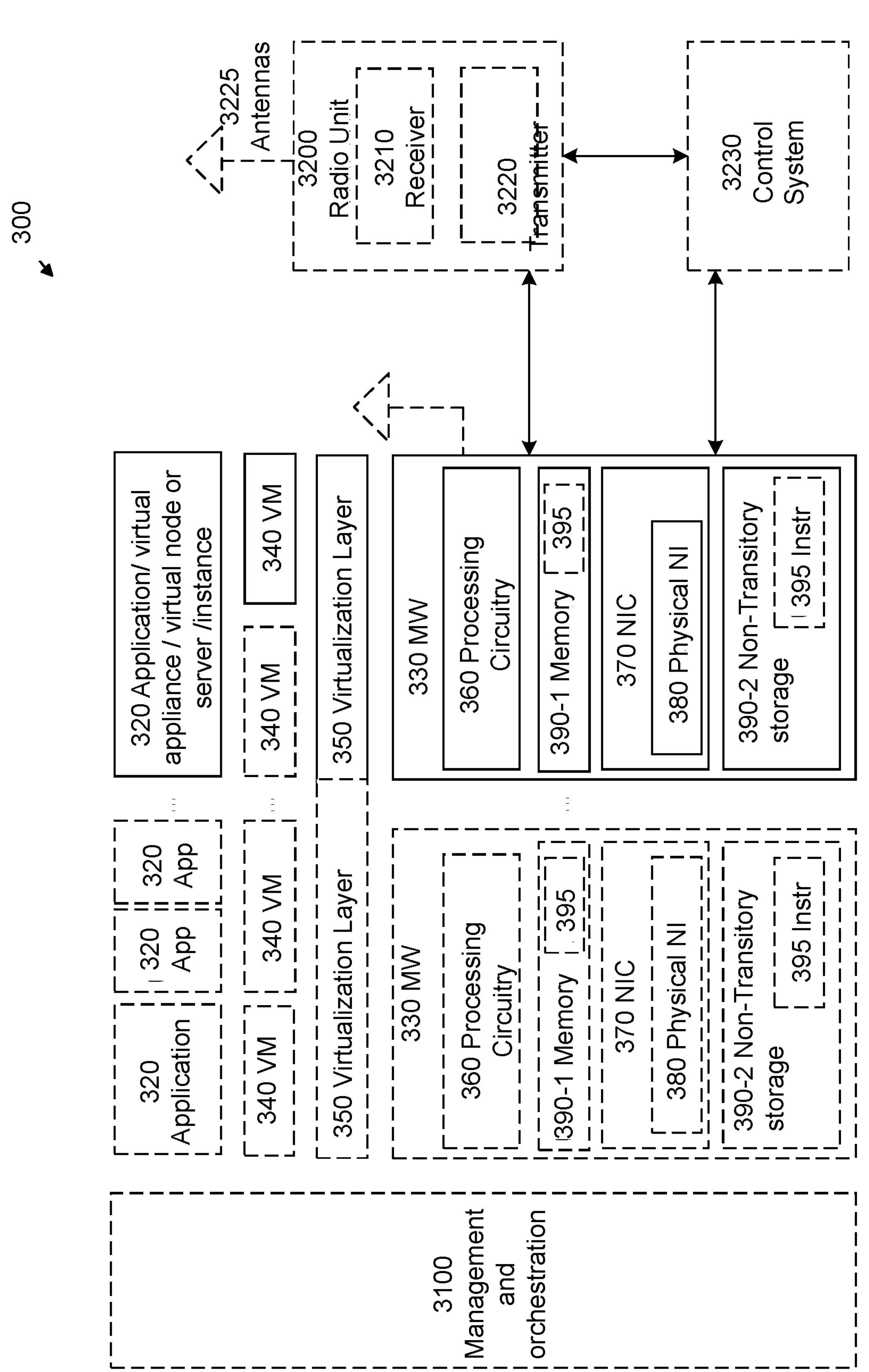
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
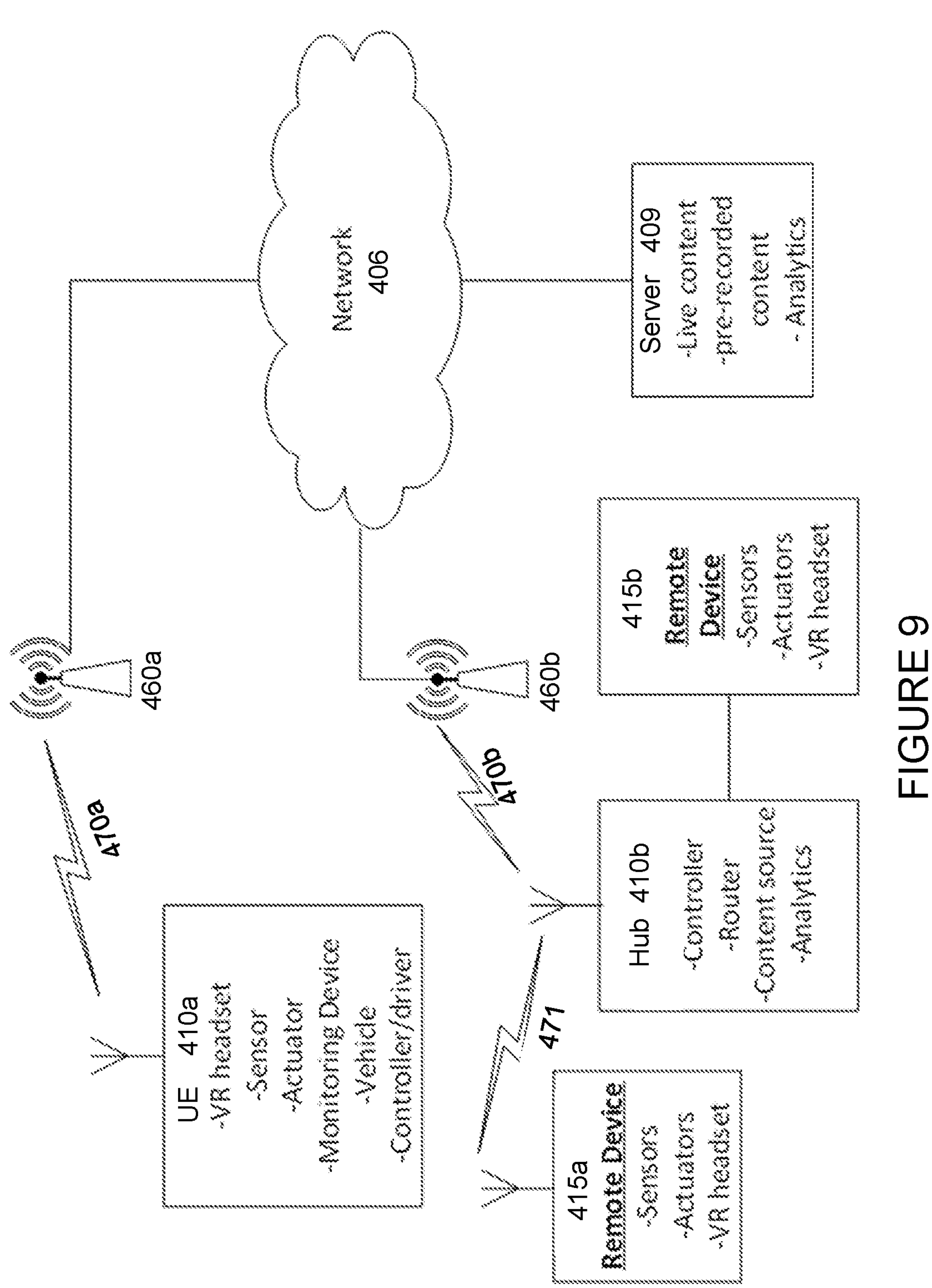
FIG. 9 illustrates another example wireless network, according to certain embodiments.

FIG. 9 illustrates another example wireless network, according to certain embodiments. Specifically, FIG. 9 depicts a wireless network comprising different devices connected, either directly or indirectly, to the wireless network through one or more access network nodes, such as gNBs 460*a* and 460*b*. In particular, the wireless network includes access network nodes such as gNBs 460*a* and 460*b*, UE 410*a*, hub 410*b*, remote devices 415*a* and 415*b* and server 409. UE 410*a* and hub 410*b* may be any of a wide variety of devices capable of communicating wirelessly with gNBs 460's. Although hub 410*b* is referred to as a hub, it may also be considered a UE (with hub functionality) because it is able to communicate wirelessly with gNB 460*b* using a standard protocol, for example a wireless standard such as one provided by 3GPP. In fact, each of the devices illustrated in FIG. 9 represent a wide variety of different devices that can be used in different scenarios as discussed in more detail below. Any of these devices which are able to communicate wirelessly with a gNB, end or any other similar 3GPP access node may be considered a wireless device or UE.

Looking now at some of the possibilities, UE 410*a* may be any of a variety of different devices that are able to wirelessly communicate with gNB 460*a*. Some examples, which are listed in FIG. 9, include a virtual reality (VR) headset, a sensor, an actuator, a monitoring device, a vehicle, or a remote controller. These examples are not exhaustive and include therein a wide variety of more specific devices, including a wide range of Internet of Things (IoT) devices. For example, in embodiments where UE 410*a* is a VR headset, UE 410*a* may be a cell phone that is used with a head mount or it may be a standalone or dedicated VR headset. In some embodiments UE 410*a* may be an augmented reality (AR) headset. As an AR or VR headset UE 410*a* may be used for entertainment (e.g., gaming, videos, etc.), education/business (e.g., remote conferences, virtual lectures, etc.), medical (e.g., remote diagnostic, patient consultation, etc.), or any other use in which virtual or augmented content may be provided to a remote user. In any of these cases UE 410*a* may be receiving content via wireless connection 470*a* with gNB 460*a*.

As another example, in embodiments where UE 410*a* is a sensor or monitoring device, UE 410*a* may be a motion, gravitational, moisture, temperature, biometric, speed, door/window open, smoke, fire, volume, flow, or any other type of device that is able to detect or measure one or more conditions. As a sensor UE 410*a* may also be able to capture conditions. For example, UE 410*a* may capture images if it comprises a camera or sound if it comprises a microphone. Regardless of the type of sensor, UE 410*a* may provide an output via wireless connection 470*a* to gNB 460*a*. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, in embodiments where UE 410*a* is an actuator, UE 410*a* may be a motor, switch, or any other device that may change states in response to receiving an input via wireless connection 470*a*. For example, UE 400*a* may be a vibrator that creates vibration to provide a user with haptic feedback. As another example UE 400*a* may be a small motor that adjusts the control surfaces of a drone in flight or to a robotic arm performing a medical procedure. As another example, UE 400*a* may be a switch that remotely turns on another device, such as a light.

As another example, in embodiments where UE 410*a* is a vehicle, UE 410*a* may be a drone, car, plane, ship, train, tractor, robot, or any other type of device comprising one or more sensors and/or actuators that may change its locations whether autonomously or at the direction of a user. In such embodiments where UE 410*a* is a remotely controlled vehicle, such as a drone, it may receive instructions on movement, actuating, or sensing from a user via wireless connection 470*a* and provide location, sensor or video information back to the user via wireless connection 470*a*. In such embodiments where UE 410*a* is an autonomous vehicle it may receive alerts and other messages from other vehicles and/or infrastructure sensors via wireless connection 470*a* as well provide its own telemetry data to others via wireless connection 470*a*.

As another example, in embodiments where UE 410*a* is a remote control, UE 410*a* may be a device dedicated to controlling other devices or a general purpose computer with a program or application that provides control of other devices. UE 410*a* may send commands to a remote device via wireless connection 470*a*. UE 410*a* may also receive feedback, telemetry, or other information from the remote device via wireless connection 470*a*. UE 410*a* may present this received information to a user who may then issue commands for the remote device. For example, UE 410*a* may receive via wireless connection 470*a* a video signal from a remote surgical room and then issue commands via wireless connection 470*a* to a remote surgical machine that can execute the commands.

While only a single UE 410*a* is illustrated in FIG. 9, in practice any number of UEs may be used together with respect to a single use case. For example, a first UE 410*a* may be a speed sensor used in a drone which provides the drone's speed information to a second UE 410*a* that is a remote control operating the drone. When the user makes changes from the remote control, a third UE 410*a* that is an actuator may adjust a throttle on the drone to increase or decrease the speed. Similarly, in the example above, the first (sensor) and third (actuator) UE 410*a*'s may be a single UE that handles communication for both the speed sensor and the actuators or UE QQA 110*a* may comprise one or more of the above. Similarly, in the example above, a hub, such as hub 410*b*, may be used to handle communication between the sensors and actuators and the controller.

Hub 410*b* may be any of a variety of different devices that provides wireless access to gNB 460*b* for one or more remote devices 415*a*. Some examples of different types of hubs are listed in Figure QAA and include a controller, router, content source and analytics. Hub 410*b* may include memory to store data (e.g., video, audio, images, buffer, sensor data, file share) that is collected from, or is to be provided to, remote device 415*a*. Hub 410*b* hub may include a processor, operating system, and server functionality. Hub 410*b* may include components for wireless communication to enable wireless connection 471 to remote device 415*a* and/or components for a fixed connection to remote device 415*b*. Hub 410*b* may also include routing capabilities, firewall capabilities, a VPN-server or VPN-client. Hub 410*b* may also allow for a different communication scheme and/or schedule between hub 410*b* and remote devices 415 and between hub 410*b* and network 406.

As one example, hub 410*b* may be a broadband router enabling direct or indirect access to network 406 for remote device 415*a*. In certain embodiments, hub 410*b* may facilitate communication between remote devices 415*a* and 415*b*. This may be done with, or without, the communications passing through network 406. In some embodiments, hub 410*b* may simply forward the data from remote device 415*a* or 415*b* to network 406. In some embodiments, hub 410*b* may first filter, buffer, store, analyze or collate the data from remote device 415*a* or 415*b* before sending on the data to network 406 or another remote device. Similarly, the data from network 406 may pass directly through hub 410*b* or it may first be processed by hub 410*b* on the way to remote device 415*a* or 415*b*.

As another example, hub 410*b* may be a controller that sends commands or instructions to one or more actuators in remote device 415*a*. The commands or instructions may be received from a second remote device 415*b*, from gNB 460*b* or by executable code, script or process instructions in hub 410*b*.

As another example, hub 410*b* may be a collection place for data from one or more remote devices 415*a* and/or 415*b*. For example, remote devices 415*a* and/or 415*b* may be a sensor, a camera, measurement equipment, or any other type of device discussed herein that may provide output or receive input. Hub 410*b* may act as a temporary storage for data from, for example remote device 415*b* and, in some embodiments, may perform analysis, or other processing on the data. Hub 410*b* may have a constant/persistent or intermittent connection to gNB 460*b*.

As another example, hub 410*b* may be a content source. For example, when remote device 415*a* is a VR headset, display, loudspeaker or other media delivery device, hub 410*b* may retrieve VR assets, video, audio, or other media via gNB 460*b* which it then provides to remote device 415*a* either directly, after some local processing, and/or after adding additional local content.

Remote device 415*a* may be any of a variety of different devices, for example, remote device 415*a* may be a device comprising one or more of sensors, actuators, and/or a screen. Remote device 415*a* may alternatively be a VR (or AR) headset, a Machine-2-Machine (M2M) device, an IoT device, an internet of Everything (IoE) device, or any other type of device which is capable of accessing a communication network wirelessly via a hub or a device capable of acting as a hub, which in the present context comprise providing network access to a device which is not able to communicate directly with communication network 406 via gNB 460*a* or 460*b*. In some scenarios, remote device 415*a* may be able to establish a wireless connection with gNB 460*a* or 460*b* yet nonetheless still connects via hub QQA 110*b*. Remote device 415*b* may be similar to remote device 415*a* in most respects except that it has a wired connection to hub 410*b* rather than a wireless connection, such as wireless connection 471.

gNBs 460*a* and 460*b* may provide various wireless devices such as UE 410*a* and hub 410*b* with wireless access to network 406. Network 406 may connect the various devices illustrated in FIG. 9 including server 409 which may host a variety of applications such as live and pre-recorded content, data collection services such as retrieving and compiling data on various ambient conditions detected by a plurality of remote devices 415*a*, 415*b* or UE 410*a*, analytics functionality, social media, functions for controlling or otherwise interacting with remote devices, functions for an alarm and surveillance center, or any other such function done by a server. For example, factory status information may be collected and analyzed by server 409. As another example, server 409 may process audio and video data which may have been retrieved from UE 410*a* for use in creating maps. As another example, server 409 may collect and analyze real-time data to assist in controlling vehicle congestion (e.g., controlling traffic lights). As another example, server 409 may store surveillance video uploaded by remote device 415*b* via hub 410*b*. As another example, server 409 may store media content such as video, audio, VR, or AR which it can broadcast, multicast or unicast to remote devices such as UE 410*a* or remote device 415*a*. As other examples, server 409 may be used for energy pricing, for remote control of non-time critical electrical load to balance power generation needs, location services, presentation services (such as compiling diagrams etc. from data collected from remote devices), or any other function of collecting, retrieving, storing, analyzing and/or transmitting data.

Figure 10:
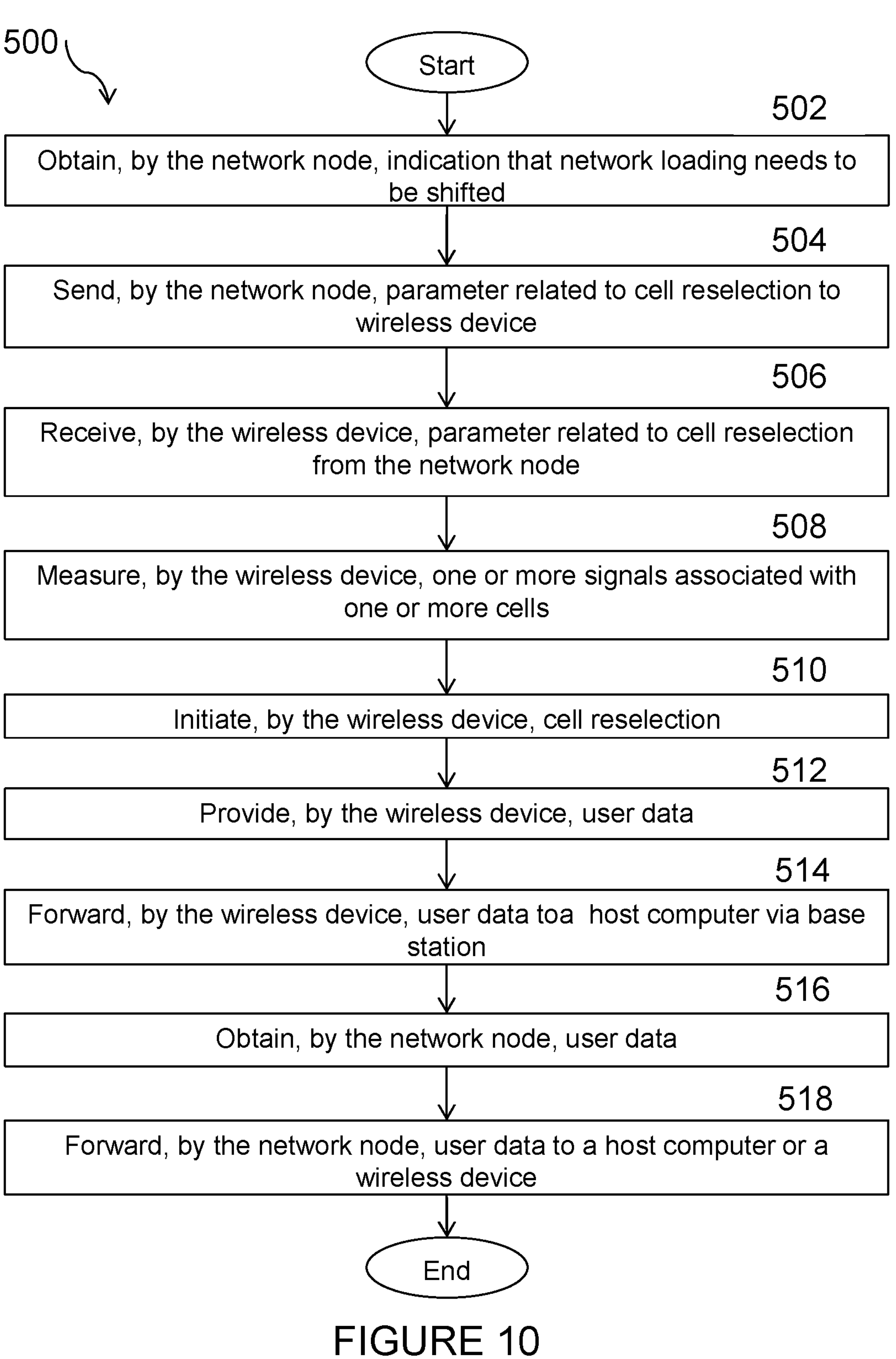
FIG. 10 illustrates a method in accordance with particular embodiments.

FIG. 10 depicts a method in accordance with particular embodiments. For purposes of simplicity FIG. 10 combines steps performed by a network node, being it TN or NTN, as well as steps performed by a wireless device. However, in practice, certain embodiments may only include steps performed by a base station or only steps performed by a wireless device. The method begins at step 502 with the network node obtaining an indication that network loading needs to be shifted. In particular, that an NTN network node is overloaded or underloaded. In some embodiments, the load level of the NTN network node may be relative to threshold values (e.g., a maximum or minimum preferred load level), not actual capacity of the NTN network node. In some embodiments, the load level may be considered relative to one or more TN network nodes that are serving the same area. The indication of the need for load balancing may be anything discussed above. For example, in some embodiments, obtaining an indication that the network loading needs to be shifted comprises determining a number of wireless devices that are camping on the network node. In some embodiments, obtaining an indication that the network loading needs to be shifted comprises determining the remaining paging capacity of the network node (either relative to threshold values or actual capacity). In some embodiments the network node may be a TN network node. In some embodiments the network node may be a NTN network node.

At step 504 network node sends a parameter to a wireless device. The parameter is related to cell reselection with respect to an NTN network node. That is, the parameter may force, encourage, or prioritize an NTN network node with respect to a TN network node, or a TN network node with respect to an NTN network node. In some embodiments, the parameter is sent to a plurality of wireless devices. For example, it could be broadcasted to all the wireless devices associated with a particular TN network node. As another example, it could be sent to a subset of the wireless devices associated with a particular network node, whether TN or NTN. As another example, the parameter may be sent to wireless devices newly attempting to connect to the network node.

The parameter can be any of a variety of the different parameters discussed above. For example, in some embodiments the parameter comprises an indication that the wireless device is to search for terrestrial network (TN) network nodes even if a suitable NTN network node has been found. Alternatively, the parameter may comprise an indication that the wireless device is to search for NTN network nodes even if a suitable terrestrial network (TN) network node has been found. In these two examples, the network node is, in essence, forcing the wireless device to search for a TN network node or a NTN network node. As another example, in some embodiments the parameter comprises a prioritized list of cells. This may result in the wireless device selecting a cell with a higher priority despite the cell providing a weaker signal for the wireless device. As another example, in some embodiments the parameter comprise an offset value to be applied to the measurements associated with one of a TN network node or a NTN network node. The offset may make TN or NTN network nodes appear better or worse depending on the offset value and where it is to be applied. As another example, in some embodiments the parameter comprises an indication to select an NTN network node if the wireless device is currently connected to a TN network node or an indication to select a TN network node if the wireless device is currently connected to a NTN network node. That is, the parameter can be used to get the wireless device to switch between a TN and a NTN network node. As another example, in some embodiments the parameter comprises an indication of a network type associated with each of a plurality of cells. The network type may indicate if a cell is associated with a TN or a NTN network node. This may provide the wireless device with additional information it can use when reselecting a cell (e.g., to know which type of network node to switch too).

At step 506 the wireless device receives the parameter from the network node.

At step 508 the wireless device measures one or more signals associated with one or more cells. Depending on the embodiment the wireless device may adjust these measurements using an offset. In some embodiments the wireless device may determine an angle of arrival associated with the one or more signals. The angle of arrival may help to inform the wireless device whether the signal is from a TN network node or an NTN network node.

At step 510 the wireless device initiates cell reselection. The selected cell is chosen based on the parameter and the measurements. For example, the wireless device may use a prioritized list of cells in combination with the measurements associated with the cells to select the desired cell.

Once the wireless device has completed cell reselection, at step 512 the wireless device is provided with user data. At step 514 the user data is forwarded the newly reselected network node. At step 516 the network node obtains the user data and, at step 518, forwards the user data to a host computer. Steps 512-518 can also be performed in reverse with data starting from a host computer and being forwarded to the wireless device via the network node.

Figure 11:
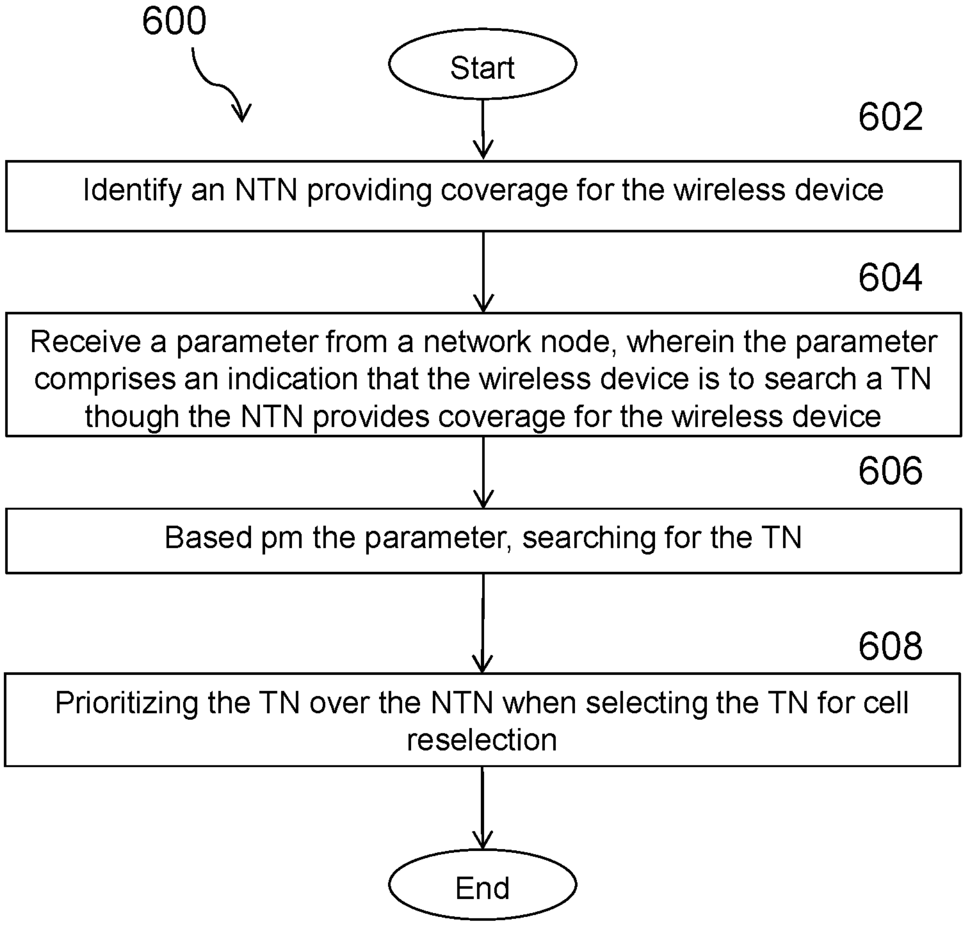
FIG. 11 illustrates a method performed by a wireless device for cell reselection, according to certain embodiments.

FIG. 11 illustrates a method 600 performed by a wireless device 110, 410*a* for cell reselection, according to certain embodiments. The method begins at step 602 when the wireless device 110 identifies an NTN providing coverage for the wireless device 110. The wireless device 110 receives, from a network node, a parameter comprising an indication to search for a TN though the NTN provides coverage for the wireless device. Based on the parameter, the wireless device 110 searches for the TN and prioritizes the TN over the NTN when selecting the TN for cell reselection.

In a particular embodiment, when searching for the TN, the wireless device 110 performs measurements on one or more signals associated with one or more TN cells or one or more NTN cells.

In a particular embodiment, when identifying the NTN, the wireless device 110 determines that a signal quality of the one or more signals associated with the one or more NTN cells is greater than a threshold.

In a particular embodiment, when prioritizing the TN over the NTN when selecting the TN for cell reselection, the wireless device applies an offset to measurements performed on one or more signals associated with the one or more TN cells. Additionally or alternatively, the wireless device applies an offset to measurements performed on one or more signals associated with the one or more NTN cells. Based on the applied offset, the wireless device 110 determines that a signal quality of the one or more TN cells is greater than a signal quality of the one or more NTN cells.

In a particular embodiment, when applying the offset to the measurements performed on the one or more signals associated with the one or more TN cells, the wireless device 110 adds the offset to one or more values associated with the measurements performed on the one or more signals associated with the one or more TN cells to result in improved signal quality of the TN cells.

In a particular embodiment, when applying the offset to the measurements performed on the one or more signals associated with the one or more NTN cells, the wireless device 110 subtracts the offset to one or more values associated with the measurements performed on the one or more signals associated with the one or more NTN cells to result in reduced signal quality of the NTN cells.

In a particular embodiment, the wireless device performs a comparison of one or more values associated with measurements performed on one or more signals associated with one or more NTN cells to one or more values associated with measurements performed on one or more signals associated with one or more TN cells. Based on the comparison, the wireless device determines that the one or more TN cells have a better signal quality.

In a particular embodiment, the TN is selected for the cell reselection in response to determining that the one or more TN cells have the better signal quality.

In a particular embodiment, the parameter comprises a prioritized list of TN cells.

In a particular embodiment, the wireless device is connected to the NTN network when the wireless device receives the parameter.

In a particular embodiment, the parameter comprises an indication of a network type associated with each of a plurality of cells, and the network type indicates whether each cell is associated with the TN or the NTN network.

In a particular embodiment, the wireless device 110 determines an angle of arrival associated with the one or more signals. The wireless device 110 determines whether a particular signal is associated with the TN or the NTN based on the angle of arrival.

Figure 12:
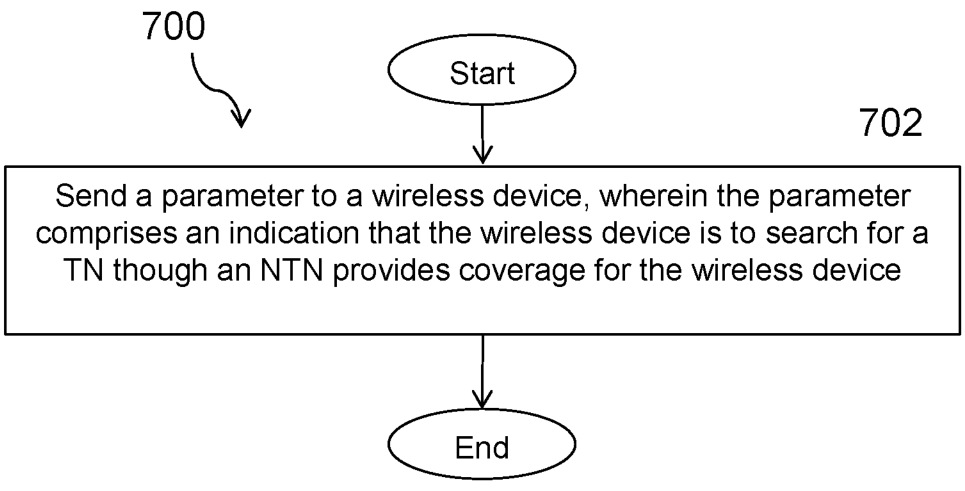
FIG. 12 illustrates a method performed by a network node for cell reselection, according to certain embodiments.

FIG. 12 illustrates a method 700 performed by a network node 160 for cell reselection, according to certain embodiments. The method begins at step 702 with the network node 160 sends a parameter to a wireless device 110. The parameter includes an indication that the wireless device 110 is to search for a TN though a NTN provides coverage for the wireless device 110.

In a particular embodiment, the parameter comprises at least one of: an offset to be applied to measurements performed on one or more signals associated with the one or more TN cells, and an offset to measurements performed on one or more signals associated with the one or more NTN cells.

In a particular embodiment, the network node 160 configures the wireless device 110 to perform at least one of: adding the offset to one or more values associated with the measurements performed on the one or more signals associated with the one or more TN cells to result in improved signal quality of the TN cells; and subtracting the offset to one or more values associated with the measurements performed on the one or more signals associated with the one or more NTN cells to result in reduced signal quality of the NTN cells.

In a particular embodiment, the network node 160 configures the wireless device 110 to perform a comparison of one or more values associated with measurements performed on one or more signals associated with one or more NTN cells to one or more values associated with measurements performed on one or more signals associated with one or more TN cells. The wireless device 110 is configured to determine that the one or more TN cells have a better signal quality based on the comparison.

In a particular embodiment, the network node 160 configures the wireless device 110 to select the TN for the cell reselection in response to determining that the one or more TN cells have the better signal quality.

In a particular embodiment, the parameter is sent to the wireless device 110 in response to determining that a network node load needs to be shifted.

In a particular embodiment, the network node 160 determines that a network load needs to be shifted based on a number of wireless devices 110 that are camped on the network node being greater than a threshold.

In a particular embodiment, the network node 160 determines that a network load needs to be shifted based on a remaining paging capacity of the network node 160 being below a threshold.

In a particular embodiment, the parameter comprises a prioritized list of TN cells.

In a particular embodiment, the parameter comprises an indication of a network type associated with each of a plurality of cells, and the network type indicating whether each cell is associated with the TN or the NTN network.

In a particular embodiment, the network node 160 is a TN network node associated with a serving cell.

In a particular embodiment, the network node 160 is a NTN network node associated with a neighboring node In a particular embodiment, the parameter is sent to a plurality of wireless devices.

In a particular embodiment, the plurality of wireless devices 110 comprises less than all of the wireless devices associated with the network node.

In a particular embodiment, the parameter is sent to the wireless device 110 when the wireless device 110 attempts to connect to the network node.

EXAMPLE EMBODIMENTS

Example Embodiment 1. A method performed by a wireless device for cell reselection involving a non-terrestrial network (NTN) network node, the method comprising: receiving a parameter from a network node, the parameter related to cell reselection involving an NTN network node; measuring one or more signals associated with one or more cells; and initiating cell reselection, wherein the selected cell is chosen based on the parameter and the measurements.

Example Embodiment 2. The method of Example Embodiment 1 wherein the parameter comprises an indication that the wireless device is to search for terrestrial network (TN) network nodes even if a suitable NTN network node has been found.

Example Embodiment 3. The method of Example Embodiment 1 wherein the parameter comprises an indication that the wireless device is to search for NTN network nodes even if a suitable terrestrial network (TN) network node has been found.

Example Embodiment 4. The method of Example Embodiment 1 wherein the parameter comprises a prioritized list of cells.

Example Embodiment 5. The method of Example Embodiment 1 wherein the parameter comprise an offset value to be applied to the measurements associated with one of a TN network node or a NTN network node.

Example Embodiment 6. The method of Example Embodiment 1 wherein the parameter comprises an indication to select an NTN network node if the wireless device is currently connected to a TN network node or an indication to select a TN network node if the wireless device is currently connected to a NTN network node.

Example Embodiment 7. The method of Example Embodiment 1 wherein the parameter comprises an indication of a network type associated with each of a plurality of cells, the network type indicating if a cell is associated with a TN or a NTN network node.

Example Embodiment 8. The method of any of Example Embodiments 1-7 further comprising determining an angle of arrival associated with the one or more signals, and determining whether a particular signal is associated with a TN network node or an NTN network node based on the angle of arrival of the associated signal.

Example Embodiment 9. The method of any of the previous Example Embodiments, further comprising: providing user data; and forwarding the user data to a host computer via the transmission to the network node.

Example Embodiment 10. A method performed by a network node for cell reselection involving a non-terrestrial network node, the method comprising: obtaining an indication that network loading needs to be shifted; and sending a parameter to a wireless device, the parameter related to cell reselection involving an NTN network node.

Example Embodiment 11. The method of Example Embodiment 10 wherein the parameter comprises an indication that the wireless device is to search for terrestrial network (TN) network nodes even if a suitable NTN network node has been found.

Example Embodiment 12. The method of Example Embodiment 10 wherein the parameter comprises an indication that the wireless device is to search for NTN network nodes even if a suitable terrestrial network (TN) network node has been found.

Example Embodiment 13. The method of Example Embodiment 10 wherein the parameter comprises a prioritized list of cells.

Example Embodiment 14. The method of Example Embodiment 10 wherein the parameter comprise an offset value to be applied to the measurements associated with one of a TN network node or a NTN network node.

Example Embodiment 15. The method of Example Embodiment 10 wherein the parameter comprises an indication to select an NTN network node if the wireless device is currently connected to a TN network node or an indication to select a TN network node if the wireless device is currently connected to a NTN network node.

Example Embodiment 16. The method of Example Embodiment 10 wherein the parameter comprises an indication of a network type associated with each of a plurality of cells, the network type indicating if a cell is associated with a TN or a NTN network node.

Example Embodiment 17. The method of any of Example Embodiments 10-16 wherein the network node is a TN network node.

Example Embodiment 18. The method of any of Example Embodiments 10-16 wherein the network node is a NTN network node.

Example Embodiment 19. The method of any of Example Embodiments 10-18 wherein the parameter is sent to a plurality of wireless devices.

Example Embodiment 20. The method of Example Embodiment 19 wherein the plurality of wireless devices comprises less than all of the wireless devices associated with the network node.

Example Embodiment 21. The method of any of Example Embodiments 10-20 wherein the parameter is sent to wireless devices newly attempting to connect to the network node.

Example Embodiment 22. The method of any of Example Embodiments 10-21 wherein obtaining an indication that the network loading needs to be shifted comprises determining a number of wireless devices that are camping on the network node.

Example Embodiment 23. The method of any of Example Embodiments 10-21 wherein obtaining an indication that the network loading needs to be shifted comprises determining remaining paging capacity of the network node.

Example Embodiment 24. The method of any of the previous Example Embodiments, further comprising: obtaining user data; and forwarding the user data to a host computer or a wireless device.

Example Embodiment 25. A wireless device for cell reselection involving a non-terrestrial network node, the wireless device comprising: processing circuitry configured to perform any of the steps of any of Example Embodiments 1 to 9; and power supply circuitry configured to supply power to the wireless device.

Example Embodiment 26. A base station for cell reselection involving a non-terrestrial network node, the base station comprising: processing circuitry configured to perform any of the steps of any of Example Embodiments 10 to 24; power supply circuitry configured to supply power to the base station.

Example Embodiment 27. A user equipment (UE) for cell reselection involving a non-terrestrial network node, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 9; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 28. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of Example Embodiments 10 to 24.

Example Embodiment 29. The communication system of the previous embodiment further including the base station.

Example Embodiment 30. The communication system of the previous 2 embodiments, further including the UE, wherein the UE is configured to communicate with the base station.

Example Embodiment 31. The communication system of the previous 3 embodiments, wherein: the processing circuitry of the host computer is configured to execute a host application, thereby providing the user data; and the UE comprises processing circuitry configured to execute a client application associated with the host application.

Example Embodiment 32. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of Example Embodiments 10 to 24.

Example Embodiment 33. The method of the previous embodiment, further comprising, at the base station, transmitting the user data.

Example Embodiment 34. The method of the previous 2 embodiments, wherein the user data is provided at the host computer by executing a host application, the method further comprising, at the UE, executing a client application associated with the host application.

Example Embodiment 35. A user equipment (UE) configured to communicate with a base station, the UE comprising a radio interface and processing circuitry configured to performs the of the previous 3 embodiments.

Example Embodiment 36. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of Example Embodiments 1 to 9.

Example Embodiment 37. The communication system of the previous embodiment, wherein the cellular network further includes a base station configured to communicate with the UE.

Example Embodiment 38. The communication system of the previous 2 embodiments, wherein: the processing circuitry of the host computer is configured to execute a host application, thereby providing the user data; and the UE's processing circuitry is configured to execute a client application associated with the host application.

Example Embodiment 39. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of Example Embodiments 1 to 9.

Example Embodiment 40. The method of the previous embodiment, further comprising at the UE, receiving the user data from the base station.

Example Embodiment 41. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of Example Embodiments 1 to 9.

Example Embodiment 42. The communication system of the previous embodiment, further including the UE.

Example Embodiment 43. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 44. The communication system of the previous 3 embodiments, wherein: the processing circuitry of the host computer is configured to execute a host application; and the UE's processing circuitry is configured to execute a client application associated with the host application, thereby providing the user data.

Example Embodiment 45. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 46. A method implemented in a communication system including a host computer, a base station and a user equipment (UE), the method comprising: at the host computer, receiving user data transmitted to the base station from the UE, wherein the UE performs any of the steps of any of Example Embodiments 1 to 9.

Example Embodiment 47. The method of the previous embodiment, further comprising, at the UE, providing the user data to the base station.

Example Embodiment 48. The method of the previous 2 embodiments, further comprising: at the UE, executing a client application, thereby providing the user data to be transmitted; and at the host computer, executing a host application associated with the client application.

Example Embodiment 49. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 50. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of Example Embodiments 10 to 24.

Example Embodiment 51. The communication system of the previous embodiment further including the base station.

Example Embodiment 52. The communication system of the previous 2 embodiments, further including the UE, wherein the UE is configured to communicate with the base station.

Example Embodiment 53. The communication system of the previous 3 embodiments, wherein: the processing circuitry of the host computer is configured to execute a host application; the UE is configured to execute a client application associated with the host application, thereby providing the user data to be received by the host computer.

Example Embodiment 54. A method implemented in a communication system including a host computer, a base station and a user equipment (UE), the method comprising: at the host computer, receiving, from the base station, user data originating from a transmission which the base station has received from the UE, wherein the UE performs any of the steps of any of Example Embodiments 1 to 9.

Example Embodiment 55. The method of the previous embodiment, further comprising at the base station, receiving the user data from the UE.

Example Embodiment 56. The method of the previous 2 embodiments, further comprising at the base station, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a wireless device for cell reselection, the method comprising:
- identifying a 3GPP non-terrestrial network, NTN, providing coverage for the wireless device;
- receiving, from a network node, a parameter comprising an indication to search for a 3GPP terrestrial network, TN, though the 3GPP NTN provides coverage for the wireless device, wherein the parameter comprises an indication of a network type associated with each of a plurality of cells, the network type indicating whether each cell is associated with the 3GPP TN or the 3GPP NTN;
- based on the parameter, searching for the 3GPP TN; and
- prioritizing the 3GPP TN over the 3GPP NTN when selecting the 3GPP TN for cell reselection, wherein prioritizing the 3GPP TN over the 3GPP NTN when selecting the TN for cell reselection comprises:
  - at least one of: applying an offset to one or more measurements performed on one or more signals associated with the one or more TN cells and applying an offset to one or more measurements performed on one or more signals associated with the one or more NTN cells; and
  - based on the applied offset, determining that a signal quality of the one or more TN cells is greater than a signal quality of the one or more NTN cells.

2. The method of claim 1, wherein searching for the 3GPP TN comprises:
- performing the one or more measurements on one or more signals associated with one or more TN cells or one or more NTN cells.

3. The method of claim 1, wherein identifying the 3GPP NTN comprises determining that a signal quality of the one or more signals associated with the one or more NTN cells is greater than a threshold.

4. The method of claim 1, wherein applying the offset to the one or more measurements performed on the one or more signals associated with the one or more TN cells comprises adding the offset to one or more values associated with the one or more measurements performed on the one or more signals associated with the one or more TN cells to result in improved signal quality of the TN cells.

5. The method of claim 1, wherein applying the offset to the one or more measurements performed on the one or more signals associated with the one or more NTN cells comprises subtracting the offset to one or more values associated with the one or more measurements performed on the one or more signals associated with the one or more NTN cells to result in reduced signal quality of the NTN cells.

6. The method of claim 1, further comprising:
- performing a comparison of one or more values associated with one or more measurements performed on one or more signals associated with one or more NTN cells to one or more values associated with one or more measurements performed on one or more signals associated with one or more TN cells; and
- based on the comparison, determining that the one or more TN cells have a better signal quality.

7. The method of claim 6, wherein the 3GPP TN is selected for the cell reselection in response to determining that the one or more TN cells have the better signal quality.

8. The method of claim 1, wherein the parameter comprises a prioritized list of TN cells.

9. The method of claim 1, wherein the wireless device is connected to the 3GPP NTN when the wireless device receives the parameter.

10. The method of claim 1, further comprising determining an angle of arrival associated with the one or more signals, and determining whether a particular signal is associated with the 3GPP TN or the 3GPP NTN based on the angle of arrival.

11. A method performed by a network node for cell reselection, the method comprising:
- sending a parameter to a wireless device, the parameter comprising an indication that the wireless device is to search for a 3GPP terrestrial network, TN, though a 3GPP Non-terrestrial network, NTN, provides coverage for the wireless device, wherein the parameter comprises an indication of a network type associated with each of a plurality of cells, the network type indicating whether each cell is associated with the 3GPP TN or the 3GPP NTN; and
- configuring the wireless device to prioritize the 3GPP TN over the 3GPP NTN when selecting the TN for cell reselection by performing:
  - at least one of: applying an offset to one or more measurements performed on one or more signals associated with the one or more TN cells and applying an offset to one or more measurements performed on one or more signals associated with the one or more NTN cells; and
  - based on the applied offset, determining that a signal quality of the one or more TN cells is greater than a signal quality of the one or more NTN cells.

12. The method of claim 11, wherein the parameter comprises at least one of:

the offset to be applied to the one or more measurements performed on one or more signals associated with the one or more TN cells, and the offset to the one or more measurements performed on one or more signals associated with the one or more NTN cells.

13. The method of claim 12, wherein configuring the wireless device to apply the offset comprises configuring the wireless device to perform at least one of:

add the offset to one or more values associated with the one or more measurements performed on the one or more signals associated with the one or more TN cells to result in improved signal quality of the TN cells; and subtract the offset to one or more values associated with the one or more measurements performed on the one or more signals associated with the one or more NTN cells to result in reduced signal quality of the NTN cells.

14. The method of claim 12, wherein configuring the wireless device to determine that the signal quality of the one or more TN cells is greater than the signal quality of the one or more NTN cells comprises configuring the wireless device to:

perform a comparison of one or more values associated with the one or more measurements performed on the one or more signals associated with one or more NTN cells to one or more values associated with the one or more measurements performed on the one or more signals associated with one or more TN cells; and based on the comparison, determine that the one or more TN cells have a better signal quality.

15. The method of claim 12, further comprising configuring the wireless device to select the 3GPP TN for the cell reselection in response to determining that the one or more TN cells have the better signal quality.

16. The method of claim 11, wherein the parameter is sent to the wireless device in response to determining that a network node load needs to be shifted.

17. The method of claim 11, further comprising determining that a network load needs to be shifted based on a number of wireless devices that are camped on the network node being greater than a threshold.

18. The method of claim 11, further comprising determining that a network load needs to be shifted based on a remaining paging capacity of the network node being below a threshold.

19. The method of claim 11, wherein the parameter comprises a prioritized list of TN cells.

20. The method of claim 11, wherein the network node is a TN network node associated with a serving cell.

21. The method of claim 11, wherein the network node is a NTN network node associated with a neighboring node.

22. The method of claim 11, wherein the parameter is sent to a plurality of wireless devices.

23. The method of claim 22, wherein the plurality of wireless devices comprises less than all of the wireless devices associated with the network node.

24. The method of claim 11, wherein the parameter is sent to the wireless devices when the wireless device attempts to connect to the network node.

25. A wireless device for cell reselection, the wireless device comprising processing circuitry configured to perform the steps of claim 1.

26. A base station for cell reselection, the base station comprising processing circuitry configured to perform the steps of claim 11.

* * * * *